(12) United States Patent
Shin et al.

(10) Patent No.: US 10,839,763 B2
(45) Date of Patent: Nov. 17, 2020

(54) DISPLAY DEVICE WITH A REDUCED SIZE OF A BEZEL AREA

(71) Applicant: Samsung Display Co., Ltd., Gyeonggi-Do (KR)

(72) Inventors: Kyoungju Shin, Gyeonggi-Do (KR); Ji-sun Kim, Seoul (KR); Se-hyang Kim, Gyeonggi-do (KR); Jonghee Kim, Gyeonggi-do (KR); Junhyun Park, Gyeonggi-do (KR); Youngwan Seo, Gyeonggi-do (KR); Jaekeun Lim, Gyeonggi-do (KR); Chongchul Chai, Seoul (KR)

(73) Assignee: Samsung Display Co., Ltd. (KR)

( * ) Notice: Subject to any disclaimer, the term of this patent is extended or adjusted under 35 U.S.C. 154(b) by 100 days.

(21) Appl. No.: 15/658,722

(22) Filed: Jul. 25, 2017

(65) Prior Publication Data

US 2018/0068629 A1 Mar. 8, 2018

(30) Foreign Application Priority Data

Sep. 7, 2016 (KR) ........................ 10-2016-0115218

(51) Int. Cl.
*G09G 3/36* (2006.01)
*G02F 1/1345* (2006.01)

(52) U.S. Cl.
CPC ....... *G09G 3/3677* (2013.01); *G02F 1/13454* (2013.01); *G09G 3/3688* (2013.01);
(Continued)

(58) Field of Classification Search
None
See application file for complete search history.

(56) References Cited

U.S. PATENT DOCUMENTS 8,717,523 B2 5/2014 Lee et al.
8,780,308 B2 7/2014 Li et al.
(Continued)

FOREIGN PATENT DOCUMENTS

KR 10-2013-0135043 A 12/2013
WO 2014/069529 A1 5/2014

OTHER PUBLICATIONS

Hidefuni Yoshida et al., Flexible Flat-Panel Display Designs with Gate Driver Circuits Integrated within the Pixel Area, SID 2014 Digest, 2014, pp. 701-704, vol. 49.1, Sharp Corporation, Nara, Japan.

*Primary Examiner* — Amr A Awad
*Assistant Examiner* — Donna V Lui
(74) *Attorney, Agent, or Firm* — Innovation Counsel LLP

(57) ABSTRACT

The display device includes: a display panel including a plurality of gate lines extending in a first direction and arranged in a second direction, a plurality of data lines extending in the second direction and arranged in the first direction, and a plurality of dots arranged in the first and second directions; a gate driver configured to sequentially supply a gate signal to the plurality of gate lines; and a data driver configured to supply a plurality of data signals to the plurality of data lines, respectively. The gate driver includes sub-gate drivers. The sub-gate drivers are disposed in the first direction to supply the gate signal to at least two positions of each gate line. Each of the sub-gate drivers includes a plurality of stages and each stage is disposed in at least one dot.

19 Claims, 18 Drawing Sheets

(52) U.S. Cl.
CPC ... *G09G 3/3696* (2013.01); *G09G 2300/0408* (2013.01); *G09G 2300/0426* (2013.01); *G09G 2300/0439* (2013.01); *G09G 2300/0809* (2013.01); *G09G 2320/028* (2013.01); *G09G 2320/0276* (2013.01)

(56) References Cited

U.S. PATENT DOCUMENTS

| | | |
|---|---|---|
| 9,159,288 B2 | 10/2015 | Chang et al. |
| 9,218,764 B2 | 12/2015 | Yoon et al. |
| 2014/0085555 A1 | 5/2014 | Hasegawa et al. |
| 2014/0152938 A1 | 6/2014 | Lee et al. |
| 2015/0243238 A1 | 8/2015 | Jung et al. |
| 2016/0370635 A1* | 12/2016 | Tanaka .................. G02F 1/1368 |
| 2017/0047032 A1* | 2/2017 | Nishiyama ............ G02F 1/1368 |
| 2017/0047038 A1* | 2/2017 | Noma .................... G02F 1/1368 |
| 2017/0287387 A1* | 10/2017 | Eguchi ..................... G09G 3/34 |

* cited by examiner

DISPLAY DEVICE WITH A REDUCED SIZE OF A BEZEL AREA

CROSS-REFERENCE TO RELATED APPLICATIONS

This U.S. non-provisional patent application claims priority under 35 U.S.C. § 119 to Korean Patent Application No. 10-2016-0115218, filed on Sep. 7, 2016, the entire contents of which are hereby incorporated by reference.

BACKGROUND

The present disclosure herein relates to a display device, and more particularly, to a display device with a reduced size of a bezel area.

A flat-type panel display includes a display panel and a driver for driving the display panel. Generally, the driver is provided in the form of a driving chip, and is electrically connected to the display panel. Such a connection process includes a process of a Chip On Glass (COG) mounting method and a process of a Tape Automated Bonding (TAB) mounting method according to the driving chip mounting method.

The COG mounting method is a method of directly mounting a driving chip on a gate region and a data region of a display panel to transmit an electrical signal to the display panel. In general, a driving chip is bonded to a display panel using an anisotropic conductive film (ACF).

In order to reduce the number of chips used in a display device, a gate driver for supplying a gate signal to a plurality of pixels of a display panel among drivers is provided directly to a non-display area adjacent to a display area, where the pixels are provided, through a pixel process. Herein, a bezel area corresponding to the non-display area may be defined in the display panel.

SUMMARY

The present disclosure provides a display device with a reduced size of a bezel area.

An embodiment of the inventive concept provides a display device. The display device includes: a display panel including a plurality of gate lines extending in a first direction and arranged in a second direction, a plurality of data lines extending in the second direction and arranged in the first direction, and a plurality of dots arranged in the first and second directions; a gate driver configured to sequentially supply a gate signal to the plurality of gate lines; and a data driver configured to supply a plurality of data signals to the plurality of data lines, respectively.

The gate driver includes sub-gate drivers.

The sub-gate drivers are disposed in the first direction to supply the gate signal to at least two positions of each gate line.

Each of the sub-gate drivers includes a plurality of stages and each stage is disposed in at least one dot.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
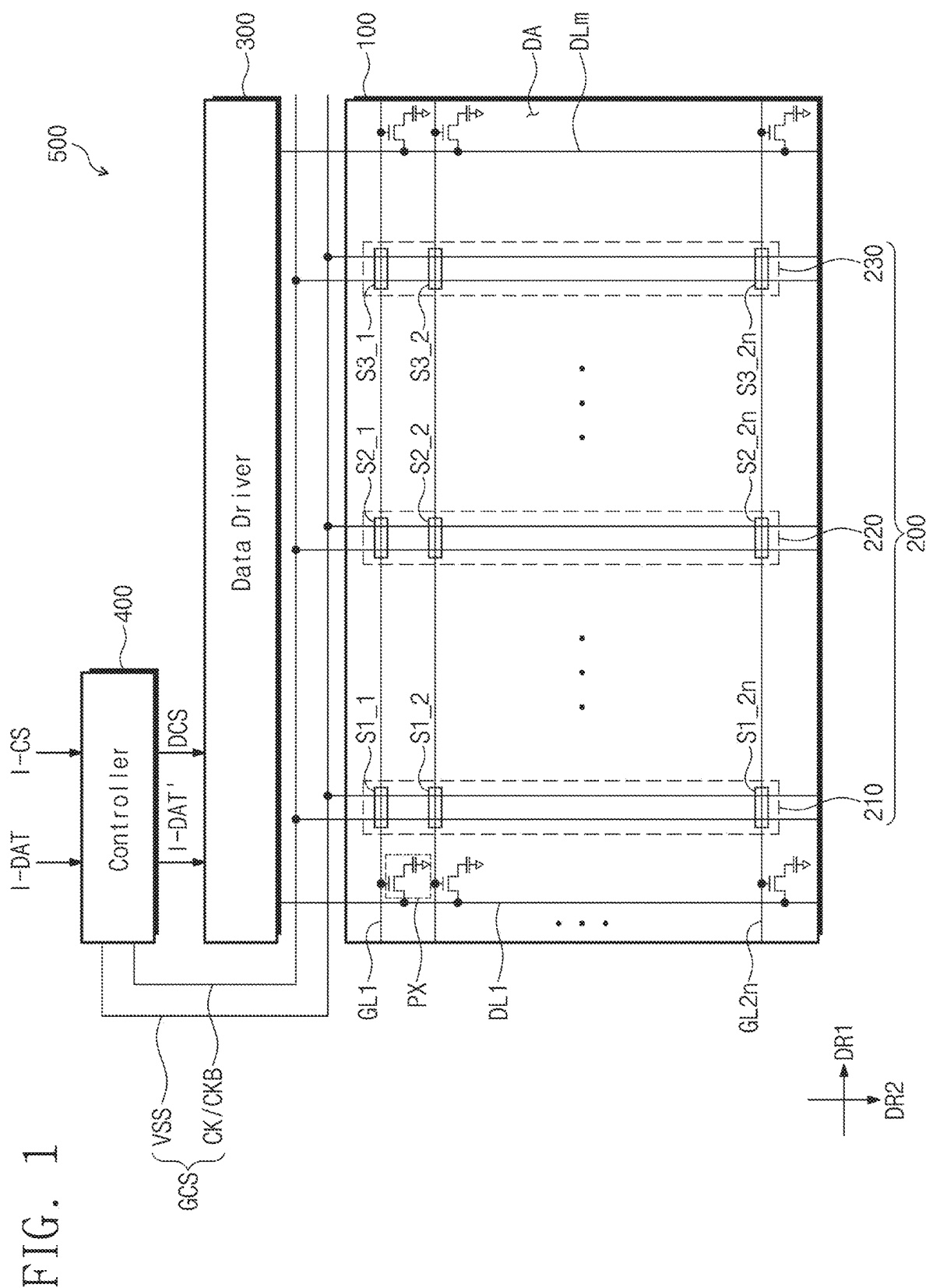
FIG. 1 is a plan view of a display device according to an embodiment of the inventive concept.

Various modifications are possible in various embodiments of the inventive concept and specific embodiments are illustrated in drawings and related detailed descriptions are listed. However, this does not limit various embodiments of the inventive concept to a specific embodiment and it should be understood that the inventive concept covers all the modifications, equivalents, and/or replacements of this disclosure provided they come within the scope of the appended claims and their equivalents.

Like reference numerals refer to like elements throughout the drawings. In the accompanying drawings, the dimensions of structures are enlarged than they actually are for the clarity of the inventive concept. It will be understood that the terms "first" and "second" are used herein to describe various components but these components should not be limited by these terms. The above terms are used only to distinguish one component from another. For example, a first component may be referred to as a second component and vice versa without departing from the scope of the inventive concept. The singular expressions include plural expressions unless the context clearly dictates otherwise.

Additionally, in various embodiments of the inventive concept, the term "include," "include," "including," or "comprising," specifies a property, a region, a fixed number, a step, a process, an element and/or a component but does not exclude other properties, regions, fixed numbers, steps, processes, elements and/or components. Additionally, it will be understood that when a portion such as a layer, a film, an area, and a plate is referred to as being 'on' another portion, it can be directly on the other portion, or an intervening portion can also be present. On the other hand, it will be understood that when a portion such as a layer, a film, an area, and a plate is referred to as being 'below' another portion, it can be directly below the other portion, or an intervening portion can also be present. Also, the term "below" in this specification may include the case where it is disposed at the lower part as well as the upper part.

Hereinafter, embodiments of the inventive concept are described in more detail with reference to the accompanying drawings.

The objects that the inventive concept is to solve, the technical solutions, and the effects will be easily understood through the embodiments related to the accompanying drawings. Each drawing has been partially simplified or exaggerated for clarity. It should be noted that, in assigning reference numerals to components of each drawing, although the components are displayed on different drawings, like reference numerals refer to like components. Additionally, in describing the inventive concept, detailed descriptions of well-known configurations or functions will be omitted if it is determined that they would obscure the subject matter of the inventive concept.

Figure 2:
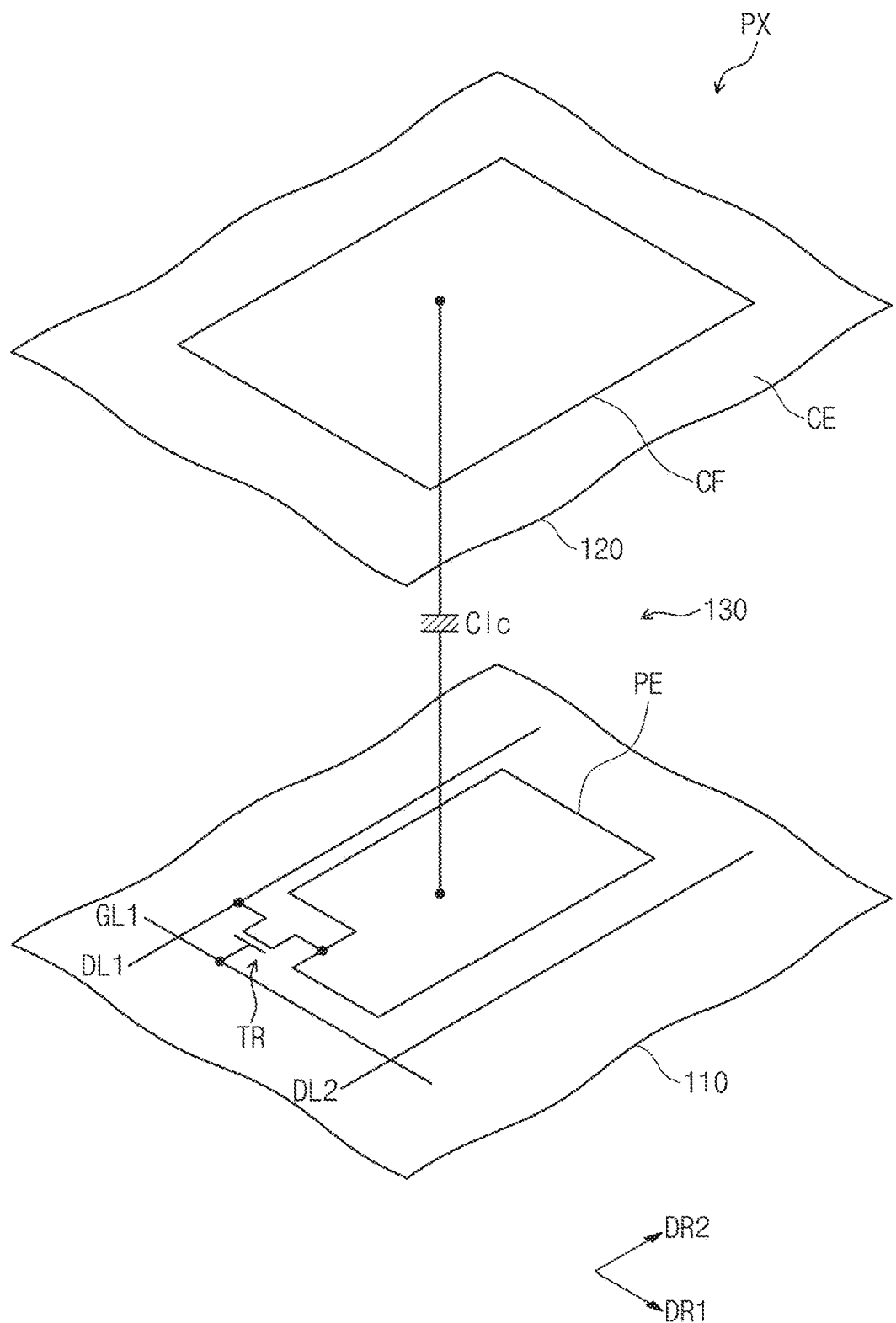
FIG. 2 is an equivalent circuit diagram of one pixel shown in FIG. 1.

FIG. 1 is a plan view of a display device according to an embodiment of the inventive concept and FIG. 2 is an equivalent circuit diagram of one pixel shown in FIG. 1 according to an embodiment of the inventive concept.

Referring to FIG. 1, a display device 500 according to an embodiment of the inventive concept includes a display panel 100 for displaying an image, a gate driver 200 and a data driver 300 for driving the display panel 100, and a controller 400 for controlling the driving of the gate driver 200 and the data driver 300.

The display panel 100 may include a lower substrate 110, an upper substrate 120 facing the lower substrate 110, and a liquid crystal layer 130 disposed between the two substrates 110 and 120.

The display panel 100 includes a plurality of gate lines GL1 to GL2n extending in a first direction DR1 and a plurality of data lines DL1 to DLm extending in a second direction DR2 intersection the first direction DR1. The gate lines GL1 to GL2n and the data lines DL1 to DLm define pixel regions and pixels PX for displaying an image are provided in a one-to-one correspondence with the pixel regions. FIG. 2 shows a pixel connected to the first gate line GL1 and the first data line DL1 among the plurality of pixels PX, as one example.

Referring to FIG. 2, the pixel PX may include a thin film transistor TR connected to the first gate line GL1 and the first data line DL1, and a liquid crystal capacitor Clc connected to the thin film transistor TR. The liquid crystal capacitor Clc uses a pixel electrode PE provided on the lower substrate 110 and a common electrode CE provided on the upper substrate 120 as two terminals, so that the liquid crystal layer 130 between the two electrodes PE and CE functions as a dielectric.

The thin film transistor TR may be provided on the lower substrate 110. The gate electrode of the thin film transistor TR may be connected to the first gate line GL1, the source electrode may be connected to the first data line DL1, and the drain electrode may be connected to the pixel electrode PE. The common electrode CE is formed entirely on the upper substrate 120 and receives a common voltage.

Unlike FIG. 2, the common electrode CE may be provided on the lower substrate 110. At this time, at least one of the two electrodes PE and CE may include a slit.

Although not shown in FIGS. 1 and 2, the pixel PX may further include a storage capacitor connected in parallel to the liquid crystal capacitor Clc. The storage capacitor may serve as an auxiliary role of the liquid crystal capacitor Clc and include the pixel electrode PE, a storage line (not shown), and an insulator disposed between the pixel electrode PE and the storage line (not shown). The storage line (not shown) may be provided on the lower substrate 110 to overlap a part of the pixel electrode PE. A constant voltage such as a storage voltage is applied to the storage line (not shown).

Although not shown in FIG. 2, according to another embodiment of the inventive concept, a display device 500 may have a structure in which each of the pixels PX is divided into two grayscale regions to improve visibility of the display device 500. In the display device having two gray scale regions, each of the pixels PX includes at least two sub-pixels, and each of the two sub-pixels may receive a data voltage based on a different gamma curve and display different grayscales for the same input image data.

The pixels PX may display one of primary colors. The primary colors may include red, green, blue, and white. The pixels PX may further display yellow, cyan, and magenta colors. Each of the pixels PX may further include a color filter CF representing one of the primary colors. Although it is shown in FIG. 2 that the color filter CF is provided on the upper substrate 120, the inventive concept is not limited thereto and the color filter CF may be provided on the lower substrate 110.

Although it is described that the display panel 100 is a liquid crystal display panel in the display device 500 of FIGS. 1 and 2, the inventive concept is not limited thereto.

The controller 400 receives image data I-DAT and a control signal I-CS from an external graphic control unit (not shown). The controller 400 converts the image data I-DAT to match the specifications of the data driver 300 and outputs the converted image data I-DAT' to the data driver 300. The controller 400 generates a data control signal DCS, and a gate control signal GCS based on the control signal I-CS. The controller 400 outputs the gate control signal GCS to the gate driver 200 and outputs the data control signal DCS to the data driver 300.

The gate control signal GCS may include a driving voltage signal VSS and a driving control signal CK/CKB for driving the gate driver 200. The driving voltage signal VSS may be a gate-off voltage and the driving control signal CK/CKB may include a clock signal CK and a clock bar signal CKB.

The gate driver 200 is electrically connected to the plurality of gate lines GL1 to GL2n and sequentially outputs a gate signal to the plurality of gate lines GL1 to GL2n. According to the inventive concept, the gate driver 200 is disposed in the display area DA of the display panel 100. In particular, the gate driver 200 may include a plurality of sub-gate drivers 210, 220, and 230 disposed in the display area DA. The plurality of sub-gate drivers 210, 220, and 230 are spaced apart from each other in the first direction DR1 in the display area DA.

As shown in FIG. 1, when the gate driver 200 is disposed in the display area DA of the display panel 100, the area or the width of a non-display area formed to surround the display area DA may be reduced. Especially, when the gate driver 200 is provided in a non-display area adjacent to one end or both ends of the plurality of gate lines GL1 to GL2n, the width of the non-display area is increased due to the gate driver 200.

However, when the gate driver 200 is disposed in the display area DA, the width of the non-display area adjacent to one end or both ends of the plurality of gate lines GL1 to GL2n is decreased. Therefore, the size of the bezel area of the display device 500 may be reduced as a whole.

For convenience of description, although it is shown in FIG. 1 that the gate driver 200 has a structure including first to third sub-gate drivers 210, 220, and 230, the number of sub-gate drivers in the gate driver 200 is not limited thereto.

Each of the first to third sub-gate drivers 210, 220 and 230 may have the same structure. The first sub-gate driver 210 includes a plurality of stages S1_1 to S1_2n that are connected to each other in a dependent manner. The plurality of stages S1_1 to S1_2n are connected to the plurality of gate lines GL1 to GL2n in a one-to-one correspondence. The plurality of stages S1_1 to S1_2n are sequentially activated in the second direction DR2 and sequentially output the gate signal to the plurality of gate lines GL1 to GL2n.

The second sub-gate driver 220 includes a plurality of stages S2_1 to S2_2n that are connected to each other in a dependent manner. The plurality of stages S2_1 to S2_2n are connected to the plurality of gate lines GL1 to GL2n in a one-to-one correspondence. The plurality of stages S2_1 to S2_2n are sequentially activated in the second direction DR2 and sequentially output the gate signal to the plurality of gate lines GL1 to GL2n.

The third sub-gate driver 230 also includes a plurality of stages S3_1 to S3_2n that are connected to each other in a dependent manner. The plurality of stages S3_1 to S3_2n are connected to the plurality of gate lines GL1 to GL2n in a one-to-one correspondence. The plurality of stages S3_1 to S3_2n are sequentially activated in the second direction DR2 and sequentially output the gate signal to the plurality of gate lines GL1 to GL2n.

When the gate driver 200 is provided in a non-display area adjacent to one end of each gate line, the gate signal supplied to each gate line may be delayed from a specific position (for example, the other end of each gate line). As a result, a phenomenon in which the charging rate of a pixel at the specific position and a deviation in charging rate between pixels (that is, between a pixel adjacent to the one end and a pixel adjacent to the other end) may occur.

However, according to the inventive concept, a plurality of stages for supplying the gate signal may be connected to each of the plurality of gate lines GL1 to GL2n at different positions. As described above, in the structure including the first to third sub-gate drivers 210 to 230, three stages may be connected to each gate line. Therefore, it is possible to prevent a phenomenon in which the charging rate of a pixel is lowered at the specific position and a deviation in charging rate between pixels from occurring.

Although not shown in the drawing, each of the stages S1_1 to S1_2n includes a plurality of driving transistors and capacitors, and they may be connected organically to output the gate signal. The driving transistor and the capacitor are formed in the display area DA simultaneously with the pixels PX through the pixel process for forming the pixels PX on the display panel 100.

The data control signal DCS is a signal for driving the data driver 300. The data driver 300 converts the image data I-DAT into a corresponding grayscale voltage in response to the data control signal DCS and outputs the grayscale voltage to the corresponding data line among the data lines DL1 to DLm as a data voltage.

The data driver 300 may include a plurality of chips and may be mounted on the display panel 100 or mounted on a separate film electrically connected to the display panel 100.

The stages S1_1 to S1_2n may have the same circuit structure. The stages S1_1 to S1_2n of the first sub-gate driver 210 may have the same circuit structure as the stages S2_1 to S2_2n of the second sub-gate driver 220. Accordingly, FIGS. 3 to 7 illustrate the circuit diagram of the nth stage S1_n among the stages S1_1 to S1_2n as an example, and the description of the configuration of the remaining stages will be omitted in order to avoid redundancy.

Figure 3:
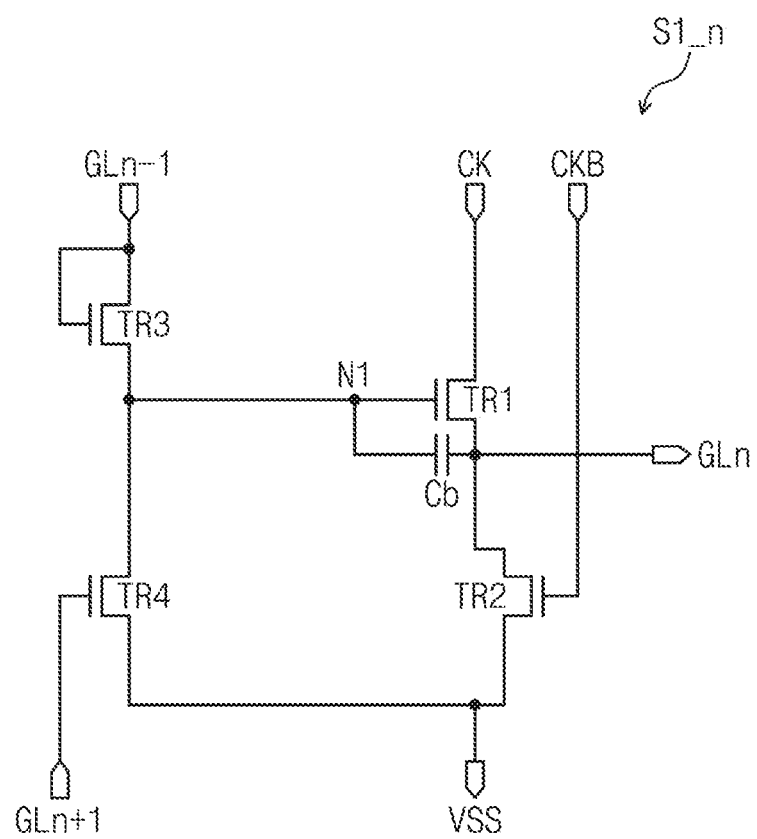
FIG. 3 is an internal circuit diagram of an nth stage according to an embodiment of the inventive concept.
Figure 4:
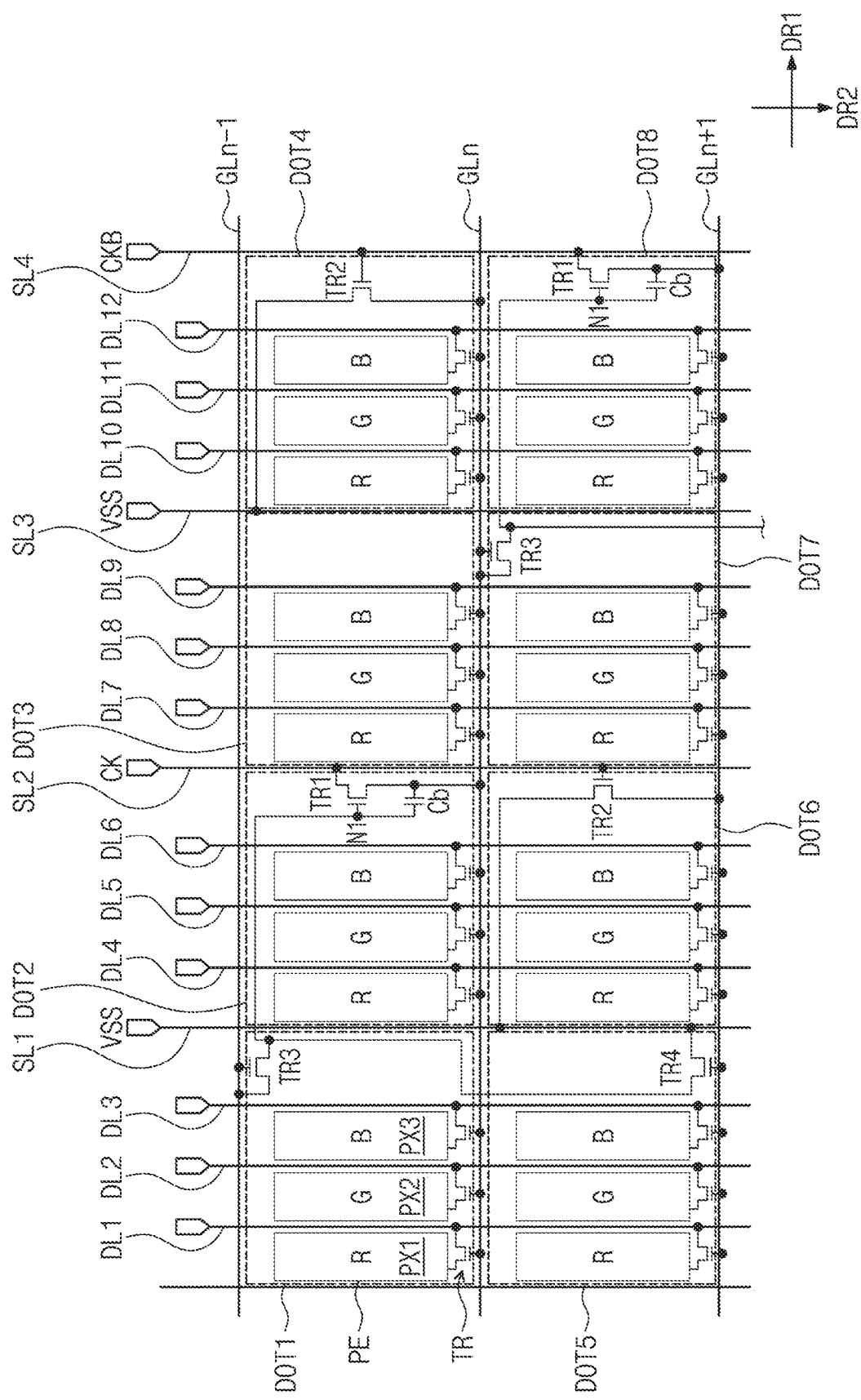
FIG. 4 is a circuit diagram illustrating that driving transistors in an nth stage shown in FIG. 3 are disposed in a display area according to an embodiment of the inventive concept.

FIG. 3 is an internal circuit diagram of an nth stage according to an embodiment of the inventive concept, and FIG. 4 is a circuit diagram illustrating that driving transistors of an nth stage shown in FIG. 3 are disposed in a display area according to an embodiment of the inventive concept.

Referring to FIG. 3, the nth stage S1_n connected to the nth gate line GLn among the stages S1_1 to S1_2n is provided. The nth stage S1_n includes first to fourth driving transistors TR1, TR2, TR3, and TR4 and a capacitor Cb.

The first driving transistor TR1 includes an input electrode for receiving the clock signal CK, a control electrode connected to a first node N1, and an output electrode connected to the nth gate line GLn. The capacitor Cb is disposed between the first node N1 and the output electrode of the first driving transistor TR1. The second driving transistor TR2 includes an input electrode for receiving the gate-off voltage VSS, a control electrode for receiving the clock bar signal CKB, and an output electrode connected to the n-th gate line GLn.

The third driving transistor TR3 includes an input electrode and a control electrode connected to the n−1th gate line GLn−1 and an output electrode connected to the first node N1, and the fourth driving transistor TR4 includes an input electrode for receiving the gate-off voltage VSS, a control electrode connected to the n+1th gate line GLn+1, and an output electrode connected to the first node N1.

When an operation of the nth stage S1_n is briefly described, the third driving transistor TR3 is turned on in response to a high-level section of the n−1th gate signal inputted through the n−1th gate line GLn−1. Then, the potential of the first node N1 rises by the n−1th gate signal in a high state. When the potential of the first node N1 rises more than the threshold voltage of the first driving transistor TR1, the first driving transistor TR1 is turned on. The clock signal CK is outputted to the nth gate line GLn through the turned-on first transistor TR1. The potential of the nth gate signal applied to the nth gate line GLn gradually rises by the clock signal CK.

The capacitor Cb is provided between the nth gate line GLn and the first node N1. Therefore, when the potential of the nth gate signal applied to the nth gate line GLn rises, the potential of the first node N1 rises by the capacitor Cb. Therefore, the nth gate signal may be shifted to a high state more quickly.

Then, when the second driving transistor TR2 is turned on in a high section of the clock bar signal CKB, the nth gate signal applied to the nth gate line GLn is discharged as the gate-off voltage VSS through the second driving transistor TR2. In addition, when the potential of the n+1th gate signal applied to the n+1th gate line GLn+1 rises, the fourth driving transistor TR4 is turned on. Therefore, the potential of the first node N1 may be discharged as the gate-off voltage VSS through the turned-on fourth transistor TR4.

Accordingly, the nth stage S1_n may output the nth gate signal, and the stages S1_1 to S1_2n may sequentially generate the first to 2nth gate signals.

Referring to FIG. 4, the n−1th, nth, and n+1th gate lines GLn−1, GLn, and GLn+1 extend in the first direction DR1. A plurality of pixels arranged in the first direction DR1 are disposed between the n−1th gate line GLn−1 and the nth gate line GLn, and a plurality of pixels arranged in the first direction DR1 are arranged between and nth gate line GLn and the n+1th gate lines GLn+1.

The first to twelfth data lines DL1 to DL12 extend in the second direction DR2. The first to twelfth data lines DL1 to DL12 receive data signals from the data driver 300 shown in FIG. 1. The first to twelfth data lines DL1 to DL12 may be arranged spaced apart from each other in the first direction DR1 and a plurality of pixels arranged in the second direction DR2 may be arranged between two adjacent data lines.

The gate driver 200 (see in FIG. 1) according to an embodiment of the inventive concept may include first to fourth signal wires SL1 to SL4. The first to fourth signal wires SL1 to SL4 may extend along the second direction DR2 and may be arranged spaced apart in the first direction DR1.

The first and third signal wires SL1 and SL3 are voltage wires for receiving the gate-off voltage VSS. The second signal wire SL2 is a clock wire for receiving the clock signal CK. The fourth signal wire SL4 is a clock bar wire for receiving the clock bar signal CKB.

Although not shown in the drawing, the gate driver 200 may further include signal wires other than the first to fourth signal wires SL1 to SL4.

The display panel 100 (see FIG. 1) includes a plurality of dots, that is, a unit for displaying an image. In FIG. 4, eight dots (e.g., first to eighth dots DOT1 to DOT8) among the plurality of dots DOT are exemplarily shown for convenience of explanation. Each of the plurality of dots DOT may include at least three pixels (hereinafter referred to as first to third pixels PX1, PX2, and PX3). The first to third pixels PX1 to PX3 may represent different colors, and each of the first to third pixels PX1 to PX3 may represent any one of red, green, and blue colors.

Each of the first to third pixels PX1 to PX3 may include a thin film transistor TR and a pixel electrode PE.

Figure 5:
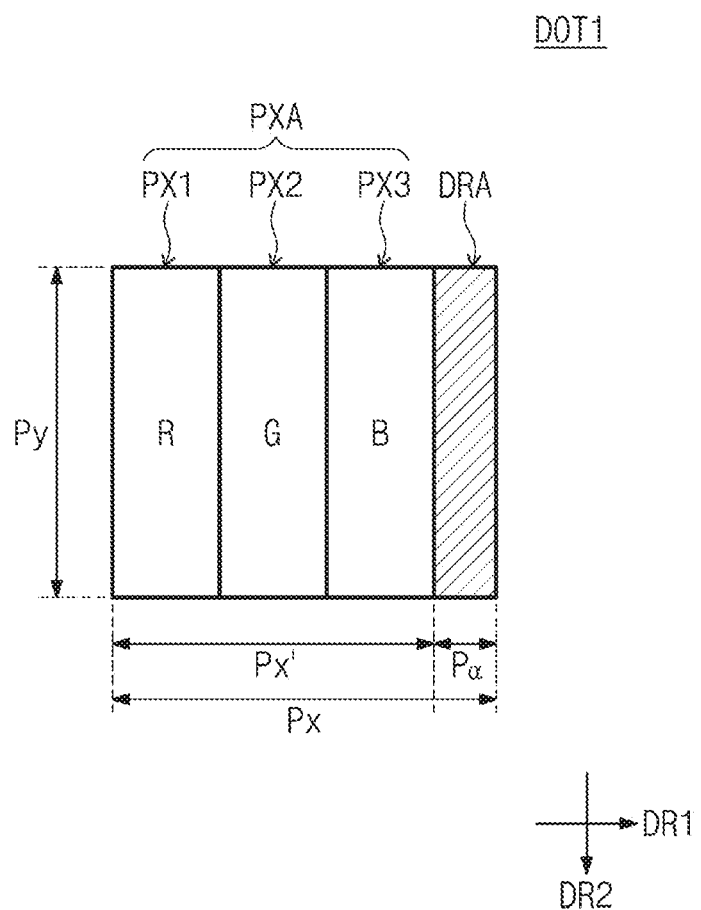
FIG. 5 is a conceptual plan view illustrating a dot shown in FIG. 4.

FIG. 5 is a conceptual plan view illustrating a first dot shown in FIG. 4.

Referring to FIG. 5, the first dot DOT1 is divided into an effective area PXA and a driving area DRA. The effective area PXA is defined as an area where the first to third pixels PX1, PX2, and PX3 are provided to display an image. The driving area DRA is not an area for displaying an image but may be an area where at least one any one of a driving transistor (i.e., at least one of the first to fourth driving transistors TR1 to TR4) constituting the stages of the first to third sub-gate drivers 210, 220, and 230, a capacitor Cb, or a signal wire (i.e., at least one of the first to fourth signal wires SL1 to SL4) is disposed.

As shown in FIG. 5, the width of the first dot DOT1 in the first direction DR1 is defined as a first width Px and the width of the first dot DOT1 in the second direction DR2 is defined as a first width Py. Here, the width of the effective area PXA in the first direction DR1 is defined as a third width Px', and the width of the driving area DRA in the first direction DR1 is defined as a fourth width Pα.

The sum of the third width Px' and the fourth width Pα is equal to the first width Px and the width of each of the first to third pixels PX1, PX2, and PX3 in the first direction DR1 has a value equal to Px'/3 in the first dot DOT1.

Although not shown in FIG. 5, specific dots (for example, the third dot DOT3 shown in FIG. 4) of the display area DA also include the driving area DRA. However, the driving transistors TR1 to TR4, the signal wires SL1 to SL4, and the capacitor Cb may not be disposed in the driving area DRA of the dot DOT3.

Referring to FIG. 4 again, the nth stage S1_n for outputting the nth gate signal to the nth gate line GLn may be distributed and disposed in the driving areas DRA of the first dot DOT1, the second dot DOT2, the fourth dot DOT4, and the fifth dot DOT5. Particularly, the first driving transistor TR1 and the capacitor Cb are disposed in the driving area DRA of the second dot DOT2 and the third driving transistor TR3 is disposed in the driving area DRA of the first dot DOT1. In addition, the second driving transistor TR2 is provided in the driving area DRA of the fourth dot DOT4 and the fourth driving transistor TR4 is provided in the driving area DRA of the fifth dot DOT5. Here, the first to fourth dots DOT1 to DOT4 are connected to the nth gate line GLn, and the fifth dot DOT5 is disposed in a row different from that of the first to fourth dots DOT1 to DOT4 and is connected to the n+1th gate line GLn+1.

As one example of the inventive concept, the first signal wire SL1 for receiving the gate-off voltage VSS is disposed between the third data line DL3 and the fourth data line DL4, and the third signal wire SL3 for receiving the gate-off voltage VSS is disposed between the ninth data line DL9 and the tenth data line DL10. The second signal wire SL2 for receiving the clock signal CK is disposed between the sixth data line DL6 and the seventh data line DL7 and the fourth signal wire SL4 for receiving the clock signal CK is disposed adjacent to the twelfth data line DL12.

The first driving transistor TR1 is disposed in the driving area DRA of the second dot DOT2 and is connected to the second signal wire SL2 and the nth gate line GLn. Specifically, the input electrode of the first driving transistor TR1 is connected to the second signal wire SL2, the control electrode is connected to the first node N1, and the output electrode is connected to the nth gate line GLn. The capacitor Cb connected between the first node N1 and the nth gate line GLn is further provided in the driving area DRA of the second dot DOT2.

The second driving transistor TR2 is disposed in the driving area DRA of the fourth dot DOT4 and is connected to the third and fourth signal wires SL3 and SL4 and the nth gate line GLn. Specifically, the input electrode of the second driving transistor TR2 is connected to the third signal wire SL3, the control electrode is connected to the fourth signal wire SL4, and the output electrode is connected to the nth gate line GLn.

The third driving transistor TR3 is disposed in the driving area DRA of the first dot DOT1 and is connected to the n−1th gate line GLn−1 and the first node N1. Particularly, the input and control electrodes of the third driving transistor TR3 are connected to the n−1th gate line GLn−1, and the output electrode is connected to the first node N1.

The fourth driving transistor TR4 is disposed in the driving area DRA of the fifth dot DOT5 and is connected to the n+1th gate line GLn+1 and the first signal wire SL1. Specifically, the input electrode of the fourth driving transistor TR4 is connected to the first signal wire SL1, the control electrode is connected to the n+1th gate line GLn+1, and the output electrode is connected to the first node N1.

In such a way, partial areas of the first, second, fourth, and fifth dots DOT1, DOT2, DOT4, and DOT5 may be utilized as a space in which the driving transistor and the capacitor or the signal wires of the nth stage S1_$n$ are formed. Therefore, it is possible to reduce the size of the bezel area of the non-display area formed on the outer side (i.e., periphery) of the display area DA.

As above, the structure in which the nth stage S1_$n$ is disposed in the driving areas DRA of the first, second, fourth, and fifth dots DOT1, DOT2, DOT4, and DOT5 is described with reference to FIG. 4. The n+1th stage S1_$n$+1 for outputting the n+1th gate signal to the n+1th gate line GLn+1 may also be arranged in the n+1th gate line GLn+1 in a similar structure to the nth stage S1_$n$. However, there may be a different connection structure from the nth stage S1_$n$ in that the first driving transistor TR1 of the n+1th stage S1_$n$+1 is connected to the fourth signal wire SL4 and the second driving transistor TR2 is connected to the second signal wire SL2.

Figure 6:
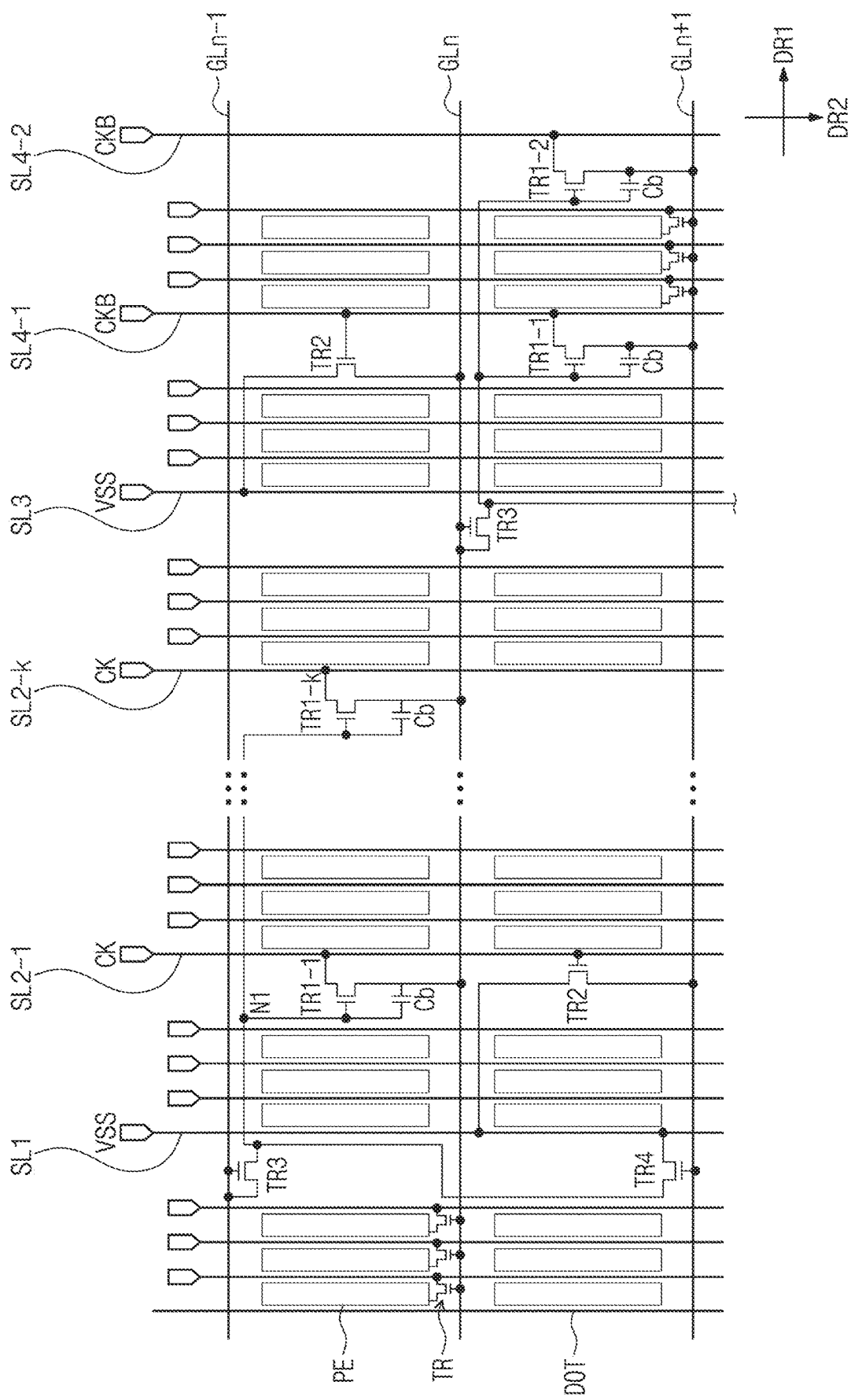
FIG. 6 is a circuit diagram illustrating that driving transistors in an nth stage shown in FIG. 3 are disposed in a display area according to another embodiment of the inventive concept.

FIG. 6 is a circuit diagram illustrating that the first driving transistors of the n-th stage shown in FIG. 3 are arranged in a display area according to another embodiment of the inventive concept.

Referring to FIG. 6, the first driving transistor TR1 of the nth stage S1_$n$ is an output transistor that is directly connected to the nth gate line GLn to output a gate signal to the nth gate line GLn.

Therefore, in order to improve the output characteristics of the gate signal, the first driving transistor TR1 may have a larger size than the second to fourth driving transistors TR2 to TR4. However, since the area of the driving area DRA is limited in each dot, the space for forming the first driving transistor TR1 may be insufficient. In this case, the first driving transistor TR1 may be divided into a plurality of sub-driving transistors TR1_1 to TR1_$k$, so that they may be divided and arranged in a plurality of dots.

As one example of the inventive concept, as shown in FIG. 6, the first driving transistor TR1 may include first to kth sub-driving transistors TR1_1 to TR1_$k$. Accordingly, the first to kth sub-driving transistors TR1_1 to TR1_$k$ may be arranged in the driving areas of k dots, respectively. In this case, the capacitor Cb may include k capacitors connected to the first to kth sub-driving transistors TR1_1 to TR1_$k$, respectively.

Although not shown in the drawing, the first driving transistor TR1 of the n+1th stage S1_$n$+1 may also include a plurality of sub-driving transistors. In this case, the plurality of sub-driving transistors may be respectively arranged in the driving areas of a plurality of dots.

Although the description limited to first driving transistor TR1 is made with reference to FIG. 6, in addition to the first driving transistor TR1, a driving transistor, which is relatively large in size and difficult to be formed in the driving area of one dot, may be divided and disposed in a plurality of dots.

Figure 7:
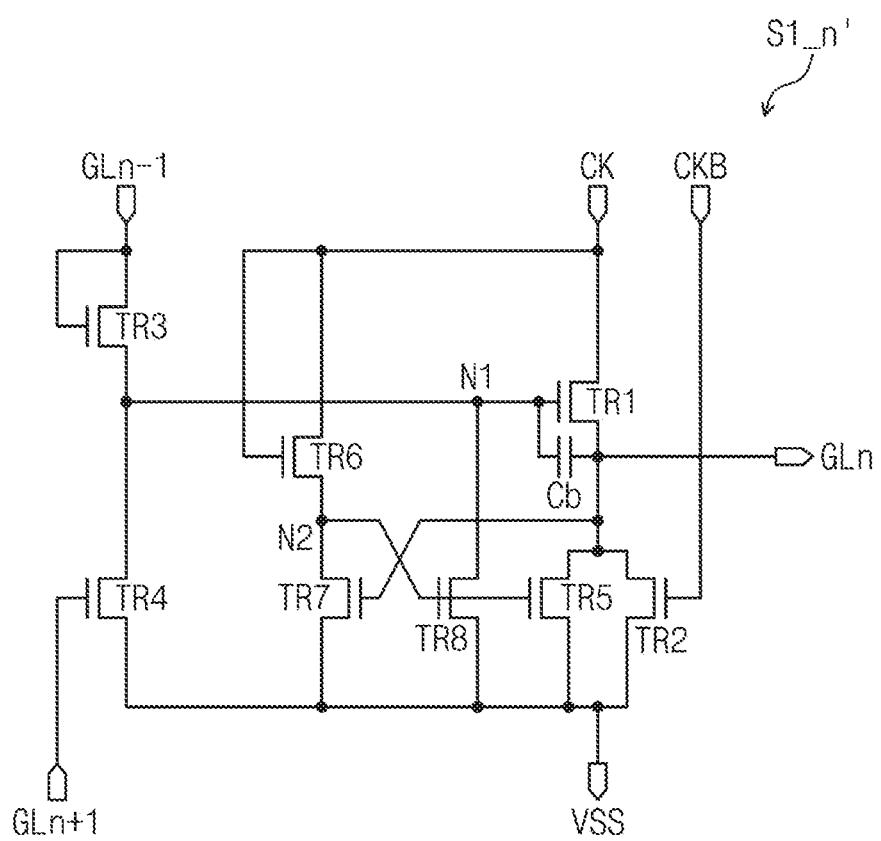
FIG. 7 is an internal circuit diagram of an nth stage according to another embodiment of the inventive concept.
Figure 8:
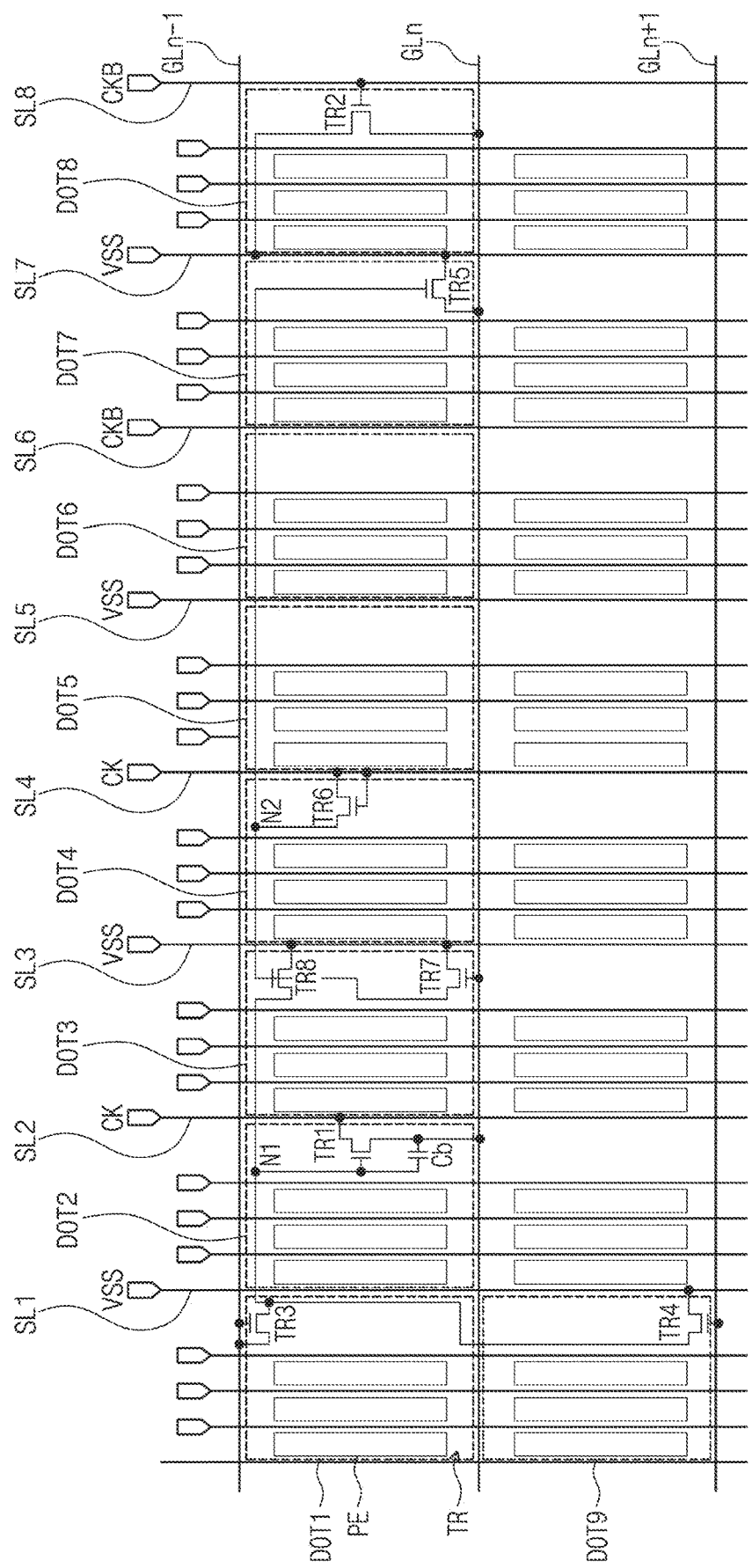
FIG. 8 is a circuit diagram illustrating that driving transistors in an nth stage shown in FIG. 7 are disposed in a display area according to an embodiment of the inventive concept.

FIG. 7 is an internal circuit diagram of an nth stage according to another embodiment of the inventive concept, and FIG. 8 is a circuit diagram illustrating that driving transistors of an nth stage shown in FIG. 7 are disposed in a display area according to an embodiment of the inventive concept. The same reference numerals are used for components for performing the same function as the components shown in FIG. 3 among components shown in FIG. 7 and a detailed description thereof is redundant and thus will be omitted.

Referring to FIG. 7, the nth stage S1_$n$' according to another embodiment of the inventive concept further includes fifth to eighth driving transistors TR5, TR6, TR7, and TR8.

The fifth driving transistor TR5 includes an input electrode for receiving the gate-off voltage VSS, a control electrode connected to the second node N2, and an output electrode connected to the nth gate line GLn. The sixth driving transistor TR6 includes input and control electrodes for receiving the clock signal CK, and an output electrode connected to the second node N2. The seventh driving transistor TR7 includes an input electrode for receiving the gate-off voltage VSS, a control electrode connected to the nth gate line GLn, and an output electrode connected to the second node N2. Finally, the eighth driving transistor TR8 includes an input electrode for receiving the gate-off voltage VSS, a control electrode connected to the second node N2, and an output electrode connected to the first node N1.

The fifth driving transistor TR5 is turned on according to the potential of the second node N2 to discharge the nth gate signal to the gate-off voltage VSS. When the nth gate signal is in a high state, the seventh driving transistor TR7 is turned on, so that the potential of the second node N2 drops down as the gate-off voltage VSS.

However, when the nth gate signal is in a low state, the potential of the second node N2 rises by the turned-on sixth driving transistor TR6 in a section where the clock signal CK is high. When the potential of the second node N2 rises, the fifth and eighth driving transistors TR5 and TR8 may be turned on, and as a result, the nth gate signal may be held as the gate-off voltage VSS by the turned-on the fifth and eighth driving transistors TR5 and TR8.

Referring to FIG. 8, the gate driver 200 (see FIG. 1) according to another embodiment of the inventive concept may include first to eighth signal wires SL1 to SL8. The first to eighth signal wires SL1 to SL8 may extend along the second direction DR2 and may be arranged spaced apart in the first direction DR1.

The first, third, fifth, and seventh signal wires SL1, SL3, SL5, and SL7 are drive voltage wires for receiving the gate-off voltage VSS, and the second and fourth signal wires SL2 and SL4 are clock wires for receiving the clock signal CK, and the sixth and eighth signal wires SL6 and SL8 are clock bar wires for receiving the clock bar signal CKB.

The nth stage S1_$n$' for outputting the nth gate signal to the nth gate line GLn may be distributed and disposed in the driving areas DRA of the first to fourth dots DOT1 to DOT4 and the seventh to ninth dots DOT7 to DOT9. Particularly, the first driving transistor TR1 and the capacitor Cb are disposed in the driving area DRA of the second dot DOT2 and the third driving transistor TR3 is disposed in the driving area DRA of the first dot DOT1. In addition, the second driving transistor TR2 is provided in the driving area DRA of the eighth dot DOT8 and the fourth driving transistor TR4 is provided in the driving area DRA of the ninth dot DOT9. The seventh and eighth driving transistors TR7 and TR8 are provided in the driving area DRA of the third dot DOT3, and the sixth driving transistor TR6 is provided in the driving area DRA of the fourth dot DOT4, and the fifth driving transistor TR5 is provided in the driving area DRA of the seventh dot DOT7.

Here, the first to eighth dots DOT1 to DOT8 are connected to the nth gate line GLn, and the ninth dot DOT9 is disposed in a row different from that of the first to eighth dots DOT1 to DOT8 and is connected to the n+1th gate line GLn+1.

The first driving transistor TR1 is disposed in the driving area DRA of the second dot DOT2 and is connected to the second signal wire SL2 and the nth gate line GLn. Specifically, the input electrode of the first driving transistor TR1 is connected to the second signal wire SL2, the control electrode is connected to the first node N1, and the output electrode is connected to the nth gate line GLn. The capacitor Cb connected between the first node N1 and the nth gate line GLn is further provided in the driving area DRA of the second dot DOT2.

The second driving transistor TR2 is disposed in the driving area DRA of the eighth dot DOT8 and is connected to the seventh and eighth signal wires SL7 and SL8 and the nth gate line GLn. Specifically, the input electrode of the second driving transistor TR2 is connected to the seventh signal wire SL7, the control electrode is connected to the eighth signal wire SL8, and the output electrode is connected to the nth gate line GLn.

The third driving transistor TR3 is disposed in the driving area DRA of the first dot DOT1 and is connected to the n−1th gate line GLn−1 and the first node N1. Particularly, the input and control electrodes of the third driving transistor TR3 are connected to the n−1th gate line GLn−1, and the output electrode is connected to the first node N1.

The fourth driving transistor TR4 is disposed in the driving area DRA of the ninth dot DOT9 and is connected to the n+1th gate line GLn+1 and the first signal wire SL1. Specifically, the input electrode of the fourth driving transistor TR4 is connected to the first signal wire SL1, the control electrode is connected to the n+1th gate line GLn+1, and the output electrode is connected to the first node N1.

The fifth driving transistor TR5 is disposed in the driving area DRA of the seventh dot DOT7 and is connected to the nth gate line GLn, the second node N2, and the seventh signal wire SL7. Specifically, the input electrode of the fifth driving transistor TR5 is connected to the seventh signal wire SL7, the control electrode is connected to the second node N2, and the output electrode is connected to the nth gate line GLn.

The sixth driving transistor TR6 is disposed in the driving area DRA of the fourth dot DOT4 and is connected to the fourth signal wire SL4 and the second node N2. Particularly, the input and control electrodes of the sixth driving transistor TR6 are connected to the fourth signal wire SL4, and the output electrode is connected to the second node N2.

The seventh and eighth driving transistors TR7 and TR8 are disposed in the driving area DRA of the third dot DOT3 and are connected to the third signal wire SL3 and the second node N2. The input electrode of the seventh driving transistor TR7 is connected to the third signal wire SL3, the control electrode is connected to the nth gate line GLn, and the output electrode is connected to the second node N2. The input electrode of the eighth driving transistor TR8 is connected to the third signal wire SL3, the control electrode is connected to the second node N2, and the output electrode is connected to the first node N1.

In such a way, partial areas of the first to fourth dots DOT1 to DOT4 and the seventh to ninth dots DOT7 to DOT9 may be utilized as a space in which the driving transistor and the capacitor or the signal wires of the nth stage S1_$n'$ are formed. Therefore, it is possible to reduce the size of a non-display area formed on the outer side (i.e., periphery) of the display area DA.

As above, the structure in which the nth stage S1_$n'$ is disposed in the driving areas DRA of the first to fourth dots DOT1 to DOT4 and the seventh to ninth dots DOT7 to DOT9 is described with reference to FIG. 8. The n+1th stage S1_$n$+1 for outputting the n+1th gate signal to the n+1th gate line GLn+1 may also have a similar circuit structure and a similar form to the nth stage S1_$n'$.

Figure 9:
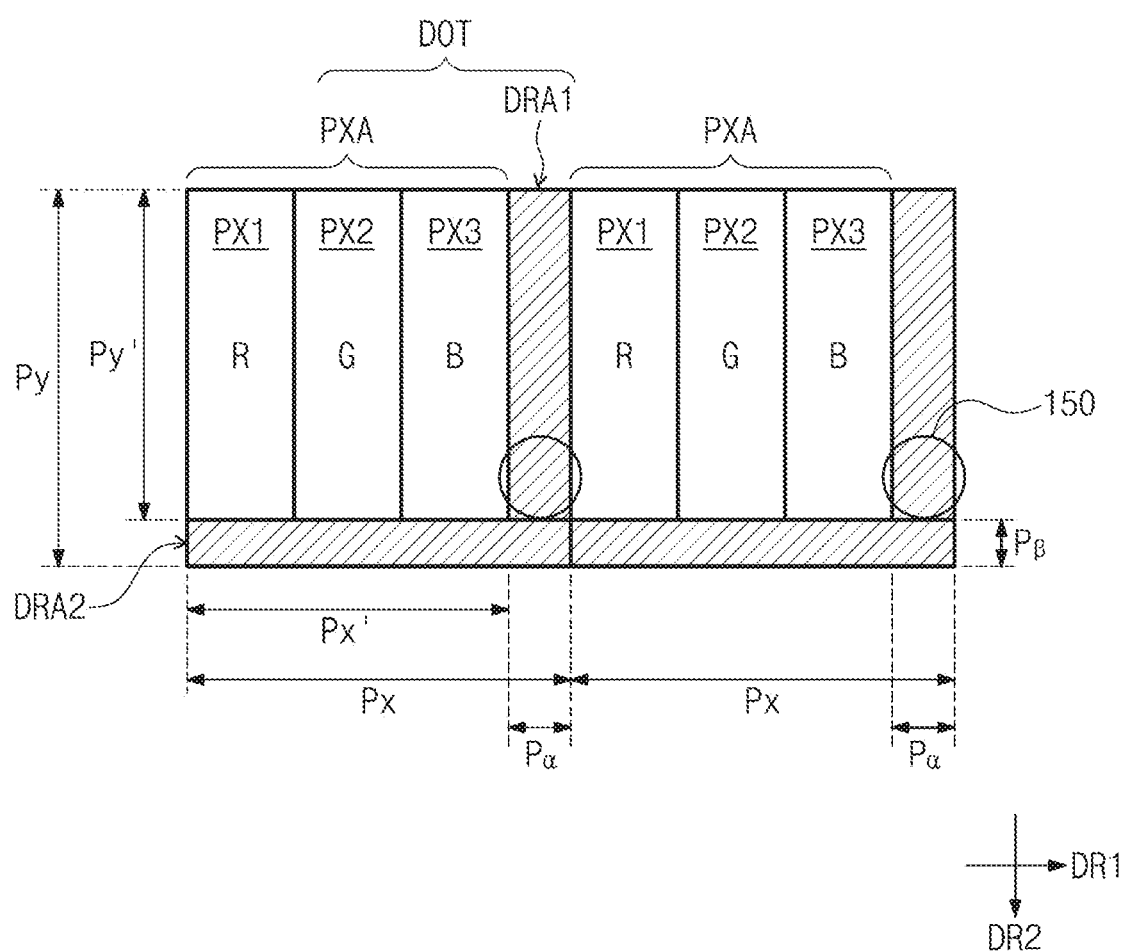
FIG. 9 is a conceptual plan view illustrating a dot according to another embodiment of the inventive concept.

FIG. 9 is a conceptual plan view illustrating a dot according to another embodiment of the inventive concept.

Referring to FIG. 9, a dot DOT according to another embodiment of the inventive concept includes an effective area PXA and a driving area DRA. The effective area PXA is defined as an area where the first to third pixels PX1, PX2, and PX3 are provided to display an image. The driving area DRA is not an area for displaying an image but may be an area where at least any one of a driving transistor (i.e., at least one of the first to fourth driving transistors TR1 to TR4) constituting the stages of the sub-gate drivers 210, 220, and 230 (see FIG. 1), a capacitor Cb, or a signal wire (i.e., at least one of the first to fourth signal wires SL1 to SL4) is disposed.

Unlike the first dot DOT1 shown in FIG. 5, the dot DOT shown in FIG. 9 according to another embodiment of the inventive concept may further include a driving area extending in the first direction DR1.

Specifically, the driving area DRA of the dot DOT includes first and second driving areas DRA1 and DRA2. The first driving area DRA1 is provided adjacent to the effective area PXA in the first direction DR1 and is formed extending in the second direction DR2. The second driving area DRA2 is provided in the effective area PXA in the second direction DR2 and is formed extending in the first direction DR1.

The dot DOT has a first width Px in the first direction DR1 and a second width Py in the second direction DR2. Here, the effective area PXA may have a third width Px' in the first direction DR1, and the first driving area DRA1 may have a fourth width Pα in the first direction DR1. In addition, the effective area PXA may have a fifth width Py' in the second direction DR2 and the second driving area DRA2 may have a sixth width Pβ in the second direction DR2.

The sum of the third width Px' and the fourth width Pα is equal to the first width Px and the width of each of the first to third pixels PX1, PX2, and PX3 in the first direction DR1 has a value equal to Px'/3 in the dot DOT. The sum of the fifth width Py' and the sixth width P$_\beta$ is equal to the second width Py and the width of each of the first to third pixels PX1, PX2, and PX3 in the second direction DR2 has a value equal to Py' in the dot DOT.

A column spacer 150 for forming a cell gap of the display panel 100 (see FIG. 1) may be formed in any one of the first and second driving areas DRA1 and DRA2. As shown in FIG. 9, when the fourth width Pα is larger than the sixth width P$_\beta$, the column spacer 150 is disposed on the side of the first driving area DRA1 to minimize the aperture ratio loss due to the column spacer 150.

Although not shown in the drawing, the column spacer 150 is interposed between the lower substrate 110 (see FIG. 2) and the upper substrate 120 (see FIG. 2) to obtain a space where the liquid crystal layer 130 (see FIG. 2) is disposed and determine a cell gap of the display panel 100.

Figure 10:
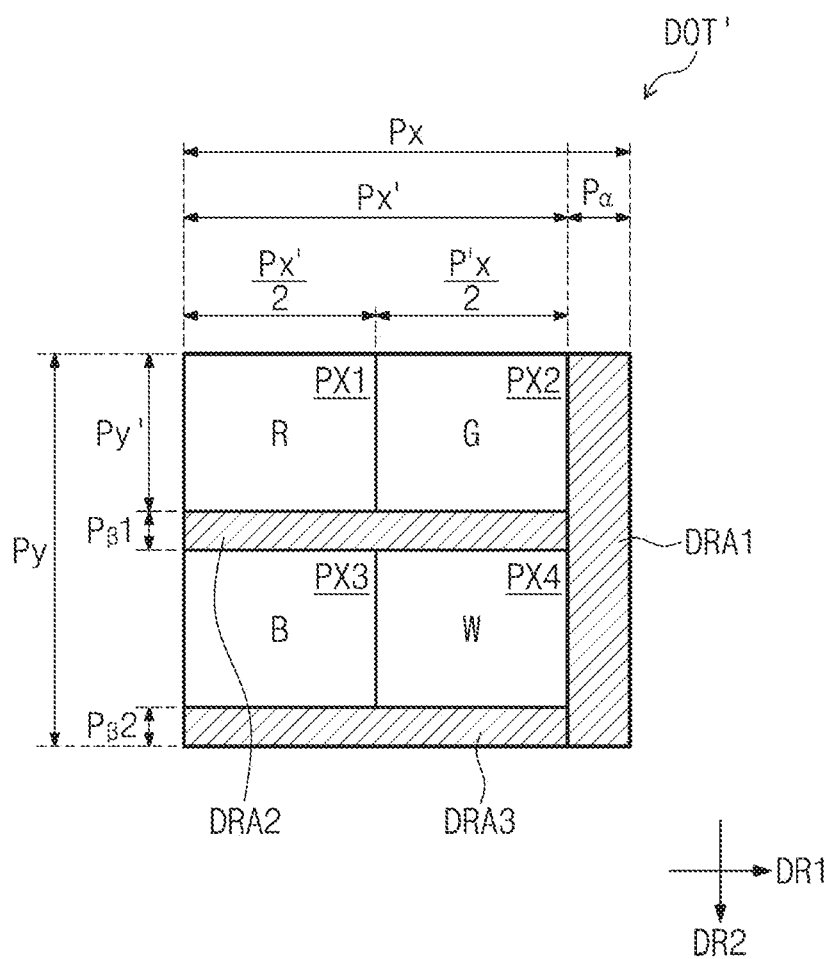
FIG. 10 is a conceptual plan view illustrating a dot according to another embodiment of the inventive concept.
Figure 11:
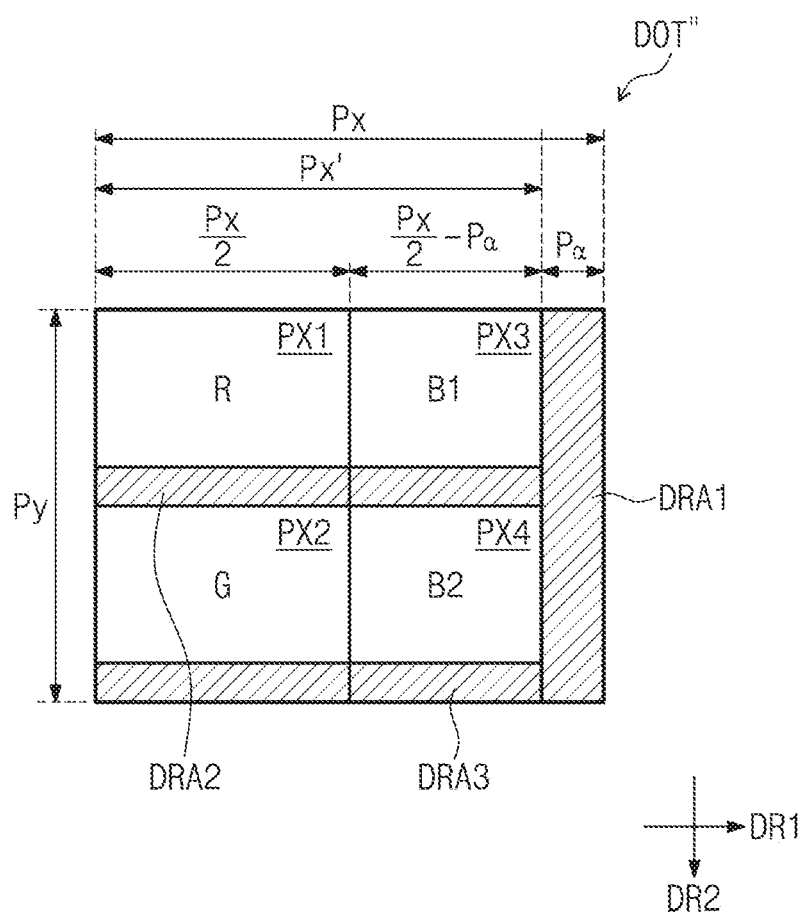
FIG. 11 is a conceptual plan view illustrating a dot according to another embodiment of the inventive concept.

FIG. 10 is a conceptual plan view illustrating a dot according to another embodiment of the inventive concept, and FIG. 11 is a conceptual plan view illustrating a dot according to another embodiment of the inventive concept.

Referring to FIG. 10, a dot DOT' according to another embodiment of the inventive concept includes an effective area PXA and a driving area DRA. The effective area PXA includes the first to fourth pixels PX1, PX2, PX3, and PX4. The first to fourth pixels PX1 to PX4 represent different colors and have any one of red, green, blue and white R, G, B, and W. The first pixel PX1 has a red color R and the second pixel PX2 has a green color G and the first and second pixels PX1 and PX2 are arranged in the first direction DR1. The third pixel PX3 has a blue color B and the fourth pixel PX4 has a white color W and the third and fourth pixels PX3 and PX4 are arranged in the first direction DR1. The first and third pixels PX1 and PX3 are arranged in the second direction DR2 and the second and fourth pixels PX2 and PX4 are arranged in the second direction DR2.

The driving area DRA is not an area for displaying an image but may be an area where at least any one of a driving transistor (i.e., at least one of the first to fourth driving transistors TR1 to TR4) constituting the stages of the sub-gate drivers 210, 220, and 230 (see FIG. 1), a capacitor Cb, or a signal wire (i.e., at least one of the first to fourth signal wires SL1 to SL4) is disposed.

The driving area DRA includes first, second, and third driving areas DRA1, DRA2, and DRA3. The first driving area DRA1 is provided adjacent to the effective area PXA in the first direction DR1 and extends in the second direction DR2. The second driving area DRA2 is provided adjacent to the first and second pixels PX1 and PX2 between the first and second pixels PX1 and PX2 and the third and fourth pixels PX3 and PX4 and extends in the first direction DR1. The third driving area DRA3 is disposed adjacent to the third and fourth pixels PX3 and PX4 in the second direction DR2 and extends in the first direction DR1. The third and fourth pixels are disposed between the second driving area DRA2 and the third driving area DRA3.

The dot DOT' has a first width Px in the first direction DR1 and a second width Py in the second direction DR2. Here, the effective area PXA may have a third width Px' in the first direction DR1, and the first driving area DRA1 may have a fourth width P$\alpha$ in the first direction DR1. In addition, the effective area PXA may have a fifth width Py' in the second direction DR2 and the second driving area DRA2 may have a sixth width P$_\beta$1 in the second direction DR2 and the third driving area DAR3 may have a seventh width P$_\beta$2 in the second direction DR2.

The sum of the third width Px' and the fourth width P$\alpha$ is equal to the first width Px and the width of each of the first and second pixels PX1 and PX2 in the first direction DR1 has a value equal to Px'/2 in the dot DOT'. That is, the widths of the first and second pixels PX1 and PX2 in the first direction DR1 are equal to each other. In addition, the widths of the third and fourth pixels PX3 and PX4 in the first direction DR1 are equal to each other with a value of Px'/2.

Referring to FIG. 11, a dot DOT' according to another embodiment of the inventive concept includes an effective area PXA and a driving area DRA. The effective area PXA includes the first to fourth pixels PX1, PX2, PX3, and PX4. The first to fourth pixels PX1 to PX4 have any one color among red, green, and blue R, G, and B. The first pixel PX1 has a red color R and the second pixel PX2 has a green color G and the first and second pixels PX1 and PX2 are arranged in the second direction DR2. The third and fourth pixels PX3 and PX4 have a blue color B and the third and fourth pixels PX3 and PX4 are arranged in the second direction DR2.

The driving area DRA includes first, second, and third driving areas DRA1, DRA2, and DRA3. The first driving area DRA1 is provided adjacent to the effective area PXA in the first direction DR1 and extends in the second direction DR2. The second driving area DRA2 is provided adjacent to the first and third pixels PX1 and PX3 in the second direction DR2 and extends in the first direction DR1. The third driving area DRA3 is provided adjacent to the second and fourth pixels PX2 and PX4 in the second direction DR2 and extends in the first direction DR1.

The dot DOT" has a first width Px in the first direction DR1 and a second width Py in the second direction DR2. Here, the effective area PXA may have a third width Px' in the first direction DR1, and the first driving area DRA1 may have a fourth width P$\alpha$ in the first direction DR1.

The sum of the third width Px' and the fourth width P$\alpha$ is equal to the first width Px and the width of each of the first and second pixels PX1 and PX2 in the first direction DR1 has a value equal to Px/2 in the dot DOT". In addition, the width of each of the third and fourth pixels PX3 and PX4 in the first direction DR1 has a value equal to Px/2−P$\alpha$. That is, a width of Px/2−P$\alpha$ of each of the third and fourth pixels PX3 and PX4 may be smaller than a width of Px/2 of each of the first and second pixels PX1 and PX2 in the first direction DR1.

As described above, in a 4-pixel structure in which four pixels are provided in one dot, when two pixels have the same color, two pixels having the same color may be formed smaller than the remaining other pixels by the width of the first driving area DRA1.

In addition to the structures shown in FIGS. 9 to 11, a method of forming a driving area in the dot may be variously modified according to the number of pixels constituting the dot and the arrangement structure.

Figure 12:
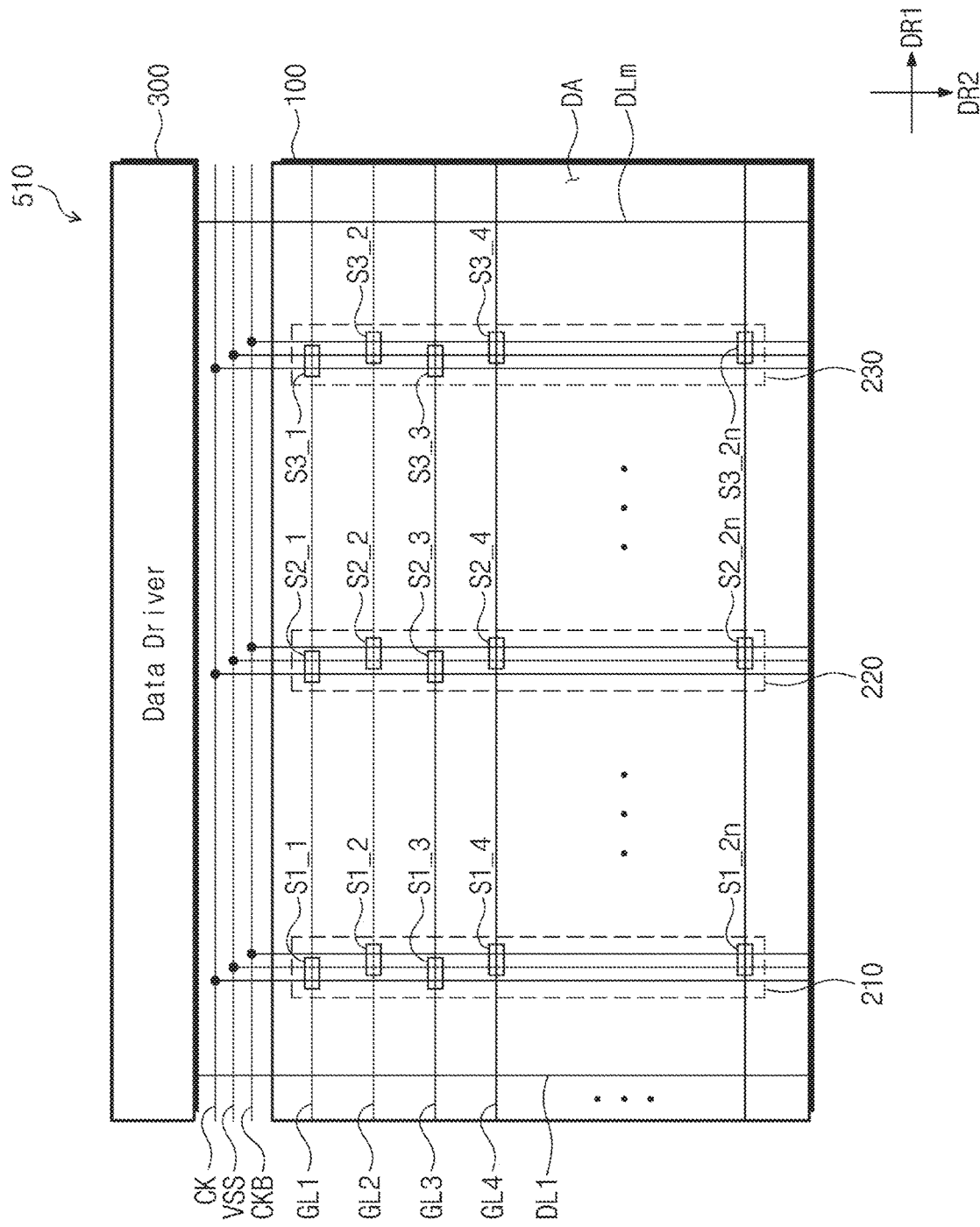
FIG. 12 is a plan view of a display device according to another embodiment of the inventive concept.
Figure 13:
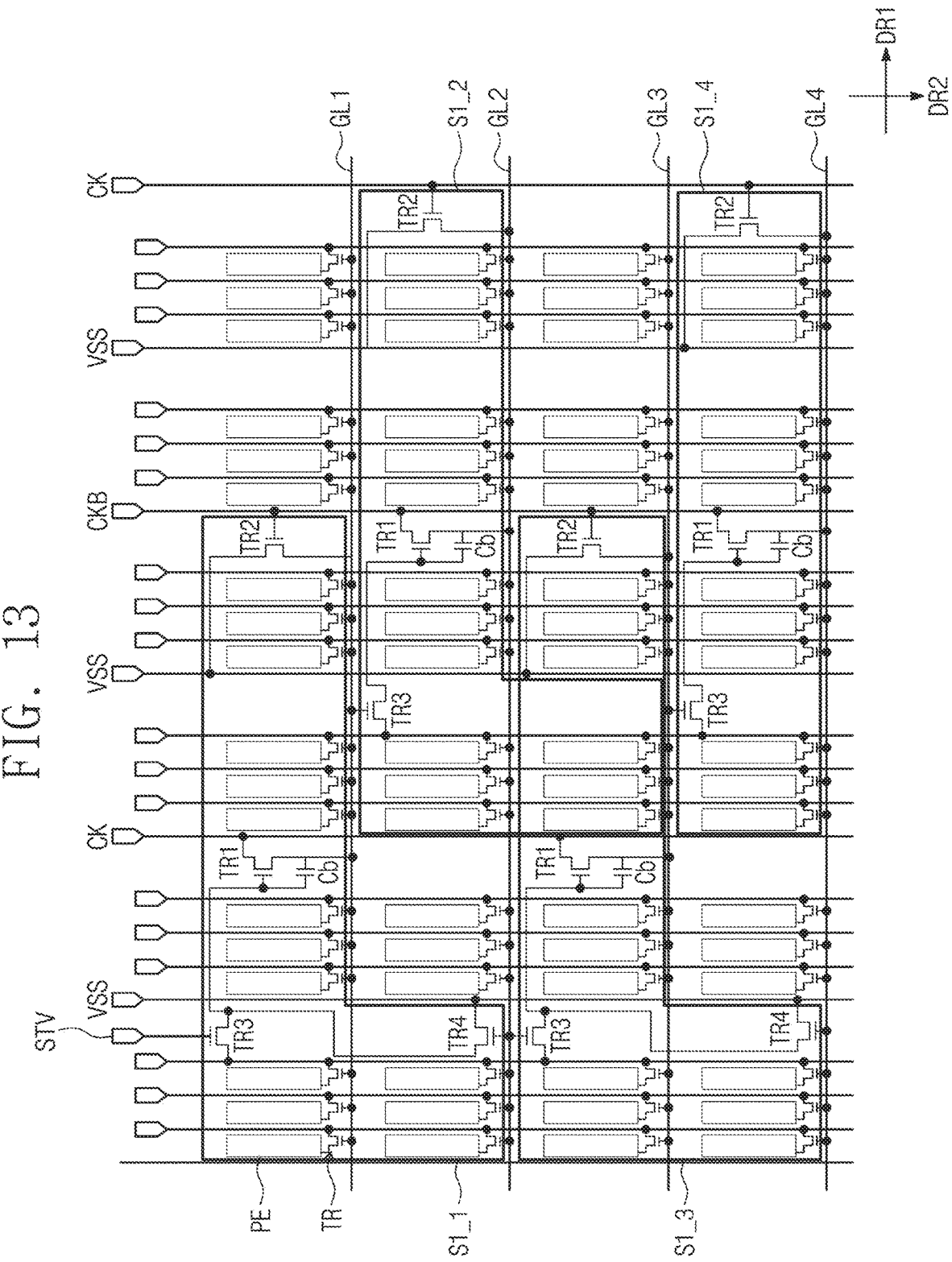
FIG. 13 is a circuit diagram illustrating that driving transistors in a stage shown in FIG. 12 are disposed in a display area according to an embodiment of the inventive concept.

FIG. 12 is a plan view of a display device according to another embodiment of the inventive concept, and FIG. 13 is a circuit diagram illustrating that driving transistors of a stage shown in FIG. 12 are disposed in a display area according to an embodiment of the inventive concept. The same reference numerals are used for components identical to the components shown in FIG. 1 among components shown in FIG. 12 and a detailed description thereof is redundant and thus will be omitted.

Referring to FIG. 12, a display device 510 according to another embodiment of the inventive concept includes first to third sub-gate drivers 210, 220, and 230. The first sub-gate driver 210 includes a plurality of stages S1_1 to S1_2$n$ connected to the plurality of gate lines GL1 to GL2$n$ in a one-to-one correspondence. The odd stages S1_1 and S1_3 and the even stages S1_2 and S1_4 of the stages S1_1 to S1_2$n$ are arranged in a zigzag form.

In the same manner, the second sub-gate driver 220 includes a plurality of stages S2_1 to S2_2$n$ connected to the plurality of gate lines GL1 to GL2$n$ in a one-to-one correspondence. The third sub-gate driver 230 also includes a plurality of stages S3_1 to S3_2$n$ connected to the plurality of gate lines GL1 to GL2$n$ in a one-to-one correspondence.

Herein, the odd stages S2_1 and S2_3 and the even stages S2_2 and S2_4 of the stages S2_1 to S2_2$n$ of the second sub-gate driver 220 may be arranged in a zigzag form. The odd stages S3_1 and S3_3 and the even stages S3_2 and S3_4 of the stages S3_1 to S3_2$n$ of the third sub-gate driver 230 may be arranged in a zigzag form.

Referring to FIG. 13, the odd stages S1_1 and S1_3 of the stages S1_1 to S1_2$n$ may be arranged in the first dot column to the fourth dot column, but the even stages S1_2 to S1_4 of the stages S1_1 to S1_2$n$ may be arranged in the third dot column to the sixth dot column. That is, the even stages S1_2 and S1_4 may be disposed at a position shifted by two dots more than the odd stages S1_1 and S1_3 in the first direction DR1. Here, the dot column may be defined as a set of dots arranged in the second direction DR2.

FIG. 13 illustrates a structure in which the even stages S1_2 and S1_4 are disposed at a position shifted by two dots more than the odd stages S1_1 and S1_3 in the first direction DR1. However, the number of dots by which the even stages S1_2 and S1_4 are shifted more than the odd stages S1_1 and S1_3 in the first direction DR1 may be modified variously.

As shown in FIG. 13, since there is no stage previous to the first stage S1_1, the start signal STV may be separately supplied to the control electrode of the third driving transistor TR3.

Figure 14:
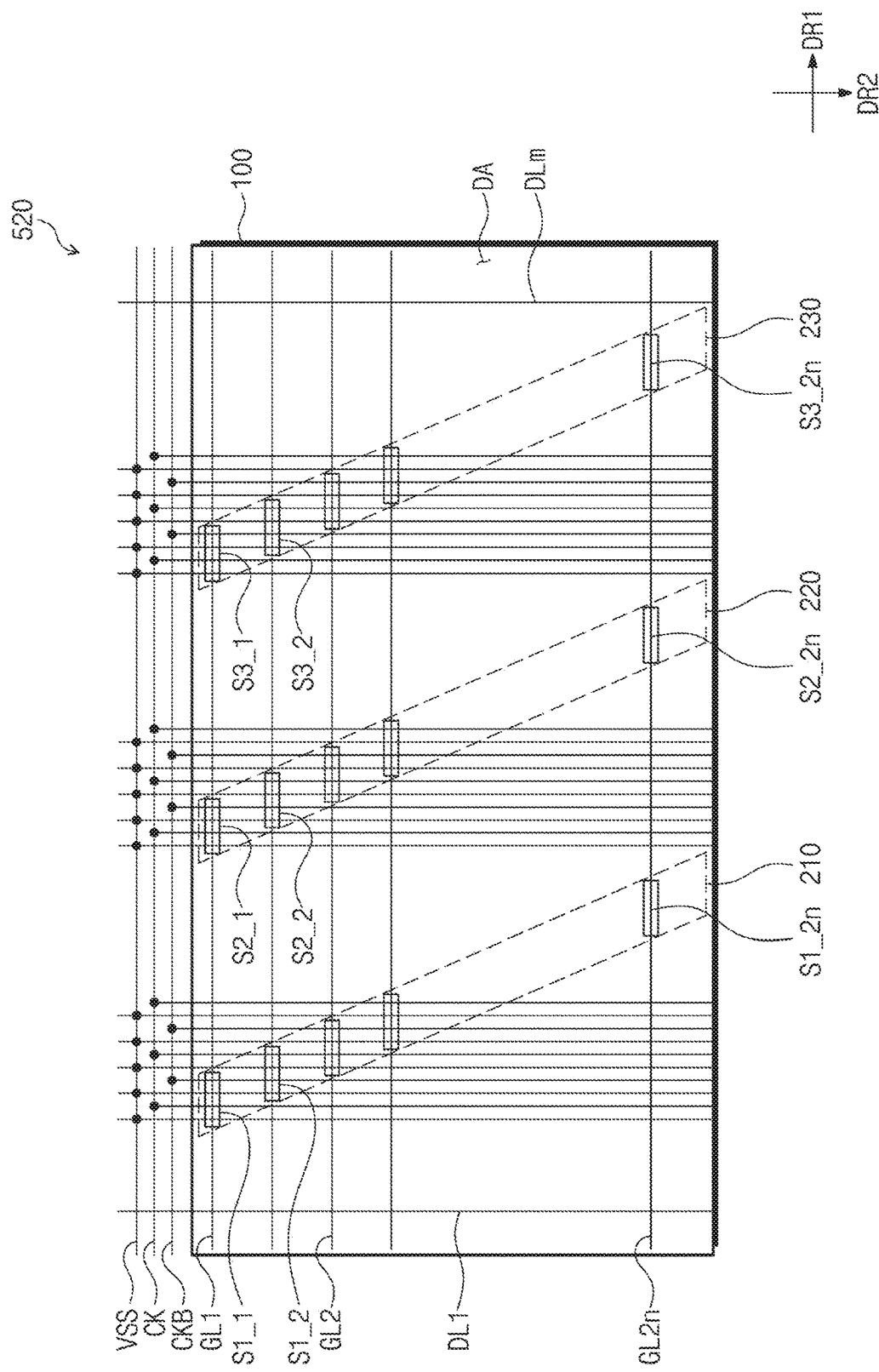
FIG. 14 is a plan view of a display device according to another embodiment of the inventive concept.
Figure 15:
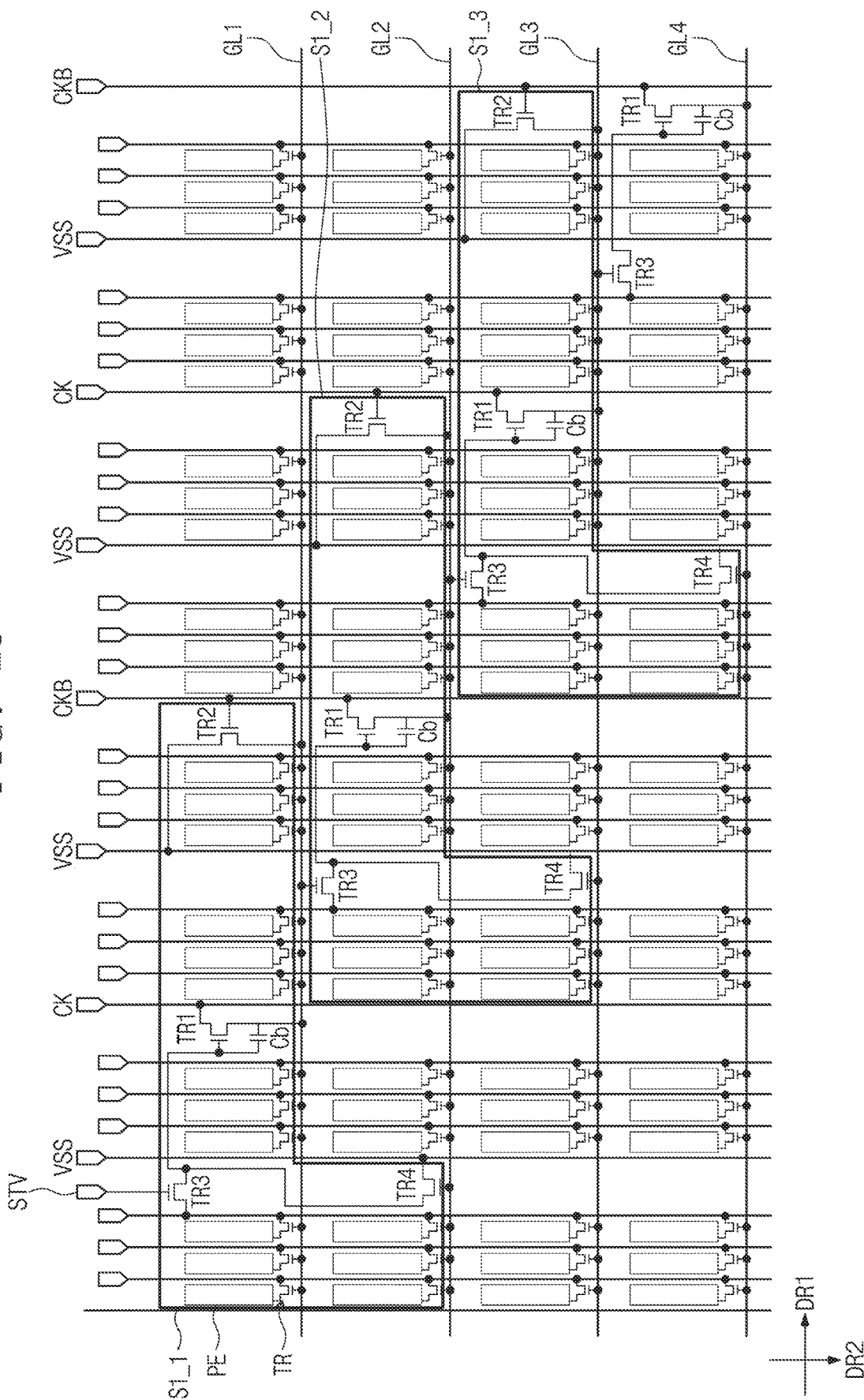
FIG. 15 is a circuit diagram illustrating that driving transistors in a stage shown in FIG. 14 are disposed in a display area according to an embodiment of the inventive concept.

FIG. 14 is a plan view of a display device according to another embodiment of the inventive concept, and FIG. 15 is a circuit diagram illustrating that driving transistors of a stage shown in FIG. 14 are disposed in a display area according to an embodiment of the inventive concept. The same reference numerals are used for components identical to the components shown in FIG. 12 among components shown in FIG. 14 and a detailed description thereof is redundant and thus will be omitted.

Referring to FIG. 14, a display device 520 according to another embodiment of the inventive concept includes first to third sub-gate drivers 210, 220, and 230. The first sub-gate driver 210 includes a plurality of stages S1_1 to S1_2n connected to the plurality of gate lines GL1 to GL2n in a one-to-one correspondence. The plurality of stages S1_1 to S1_2n may be shifted by at least one dot in the first direction DR1 as they progresses in the second direction DR2.

A plurality of stages S2_1 to S2_2n of the second sub-gate driver 220 and a plurality of stages S3_1 to S3_2n of the third sub-gate driver 230 also may be shifted by at least one dot in the first direction DR1 as they progress in the second direction DR2.

Referring to FIG. 15, the first stage S1_1 of the stages S1_1 to S1_2n may be arranged in the first dot column to the fourth dot column, but the second stage S1_2 may be arranged in the third dot column to the sixth dot column. Further, the third stage S1_3 may be disposed in the fifth to eighth dot columns.

FIG. 15 illustrates a structure in which the stages S1_1 to S1_2n are arranged at positions shifted by two dots in the first direction DR1. However, the number of dots by which the stages S1_1 to S1_2n are shifted in the first direction DR1 is not limited thereto and may be modified variously.

Figure 16:
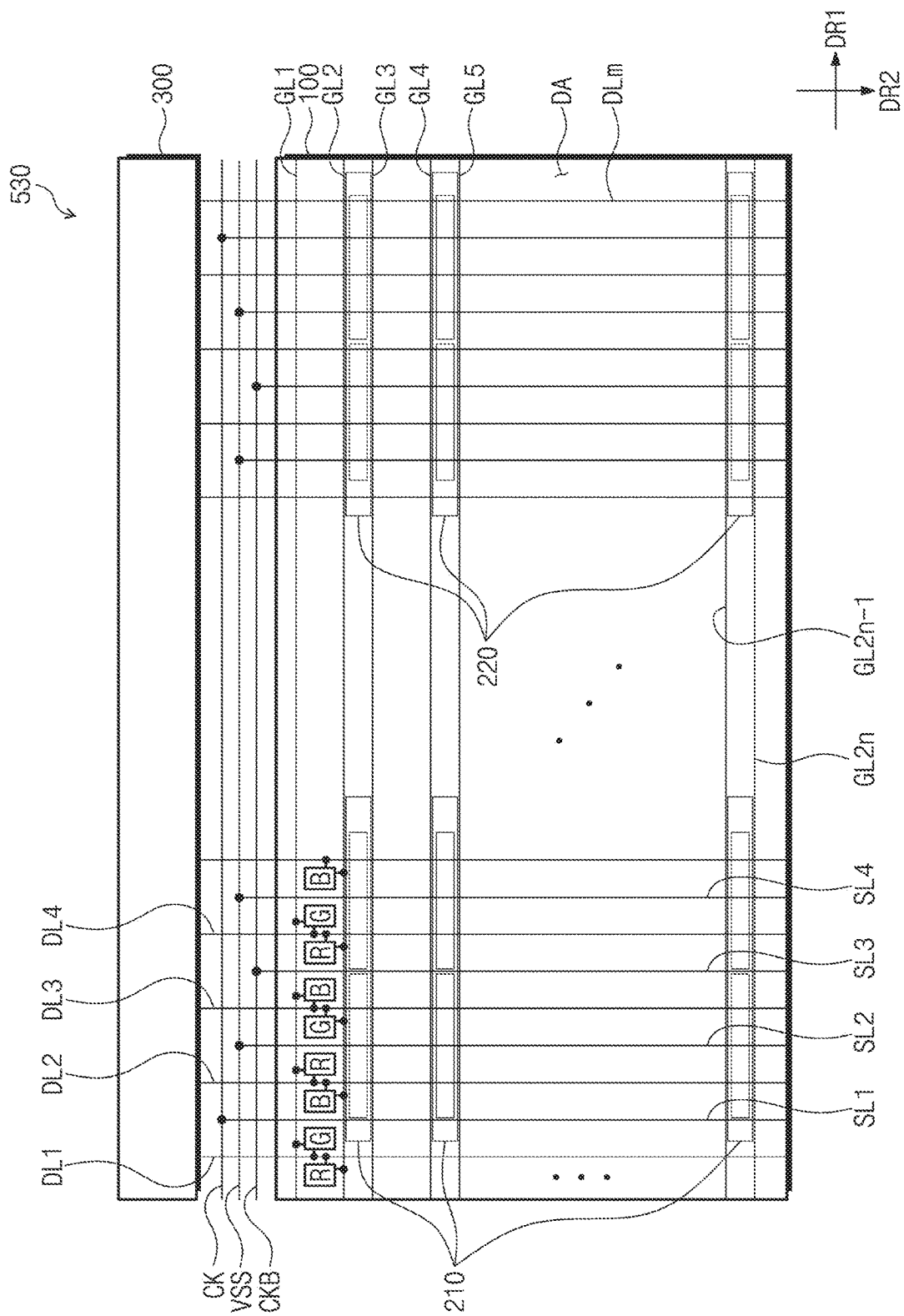
FIG. 16 is a plan view of a display device according to another embodiment of the inventive concept.
Figure 17:
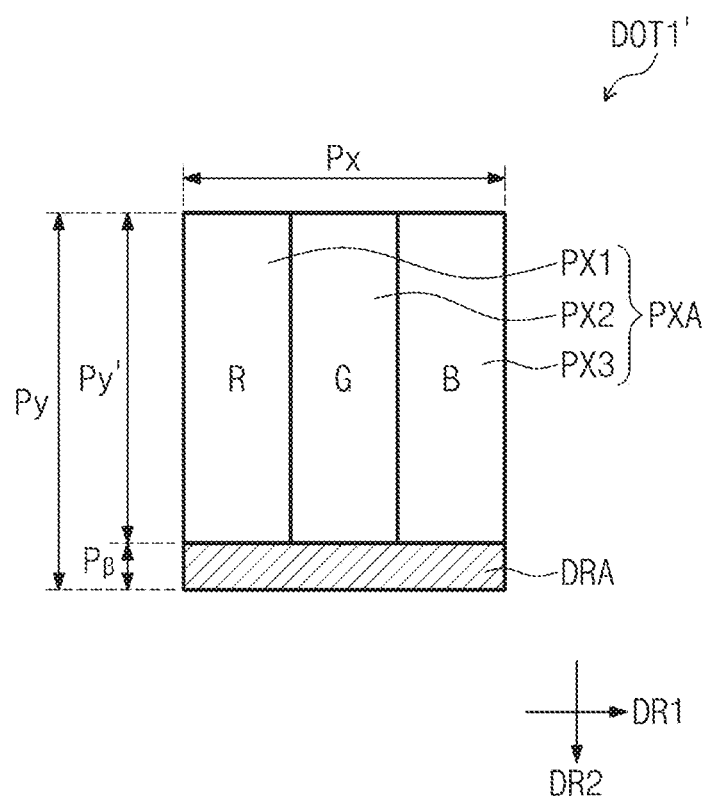
FIG. 17 is a conceptual view illustrating a structure of a dot shown in FIG. 16.
Figure 18:
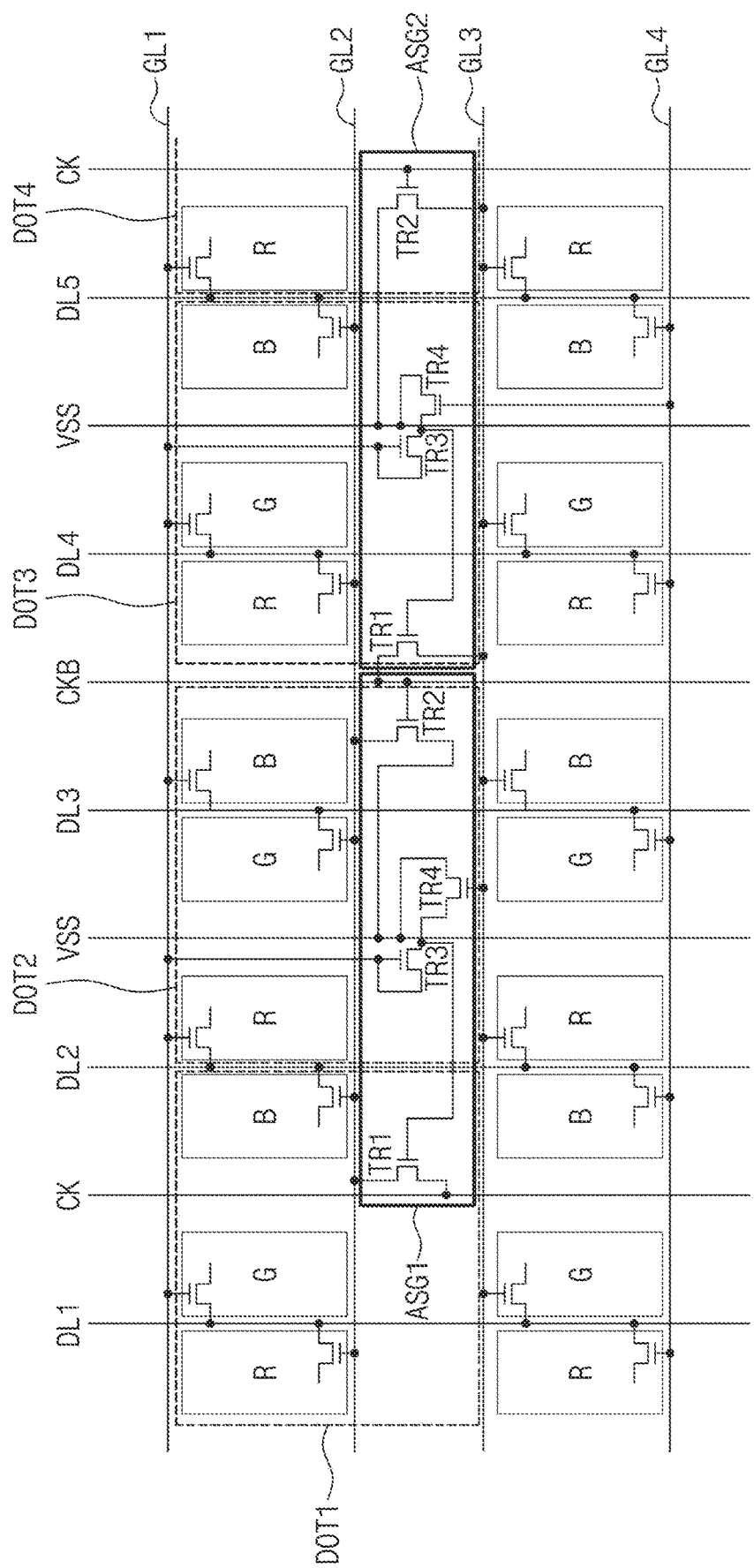
FIG. 18 is a circuit diagram illustrating that driving transistors in a stage shown in FIG. 16 are disposed in a display area according to an embodiment of the inventive concept.

FIG. 16 is a plan view of a display device according to another embodiment of the inventive concept, and FIG. 17 is a conceptual view illustrating a structure of a dot shown in FIG. 16. FIG. 18 is a circuit diagram illustrating that driving transistors of a stage shown in FIG. 16 are disposed in a display area according to an embodiment of the inventive concept. The same reference numerals are used for components identical to the components shown in FIG. 14 among components shown in FIG. 16 and a detailed description thereof is redundant and thus will be omitted.

Referring to FIGS. 16 and 18, a display device 530 according to another embodiment of the inventive concept includes a display panel 100, first and second sub-gate drivers 210 and 220, and a data driver 300.

The display panel 100 includes first to mth data lines DL1 to DLm and first to 2nth gate lines GL1 to GL2n intersecting the first to mth data lines DL1 to DLm. The first data line DL1 is commonly connected to the pixels disposed in the first pixel column and the pixels disposed in the second pixel column.

Two pixel columns (i.e., the second pixel column and the third pixel column) are disposed between the first data line DL1 and the second data line DL2, and the first signal wire SL1 is disposed between the second pixel column and the third pixel column. Here, the first signal wire SL1 may be a clock wire for receiving the clock signal CK.

Two pixel columns (i.e., the fourth pixel column and the fifth pixel column) are disposed between the second data line DL2 and the third data line DL3, and the second signal wire SL2 is disposed between the fourth pixel column and the fifth pixel column. Here, the second signal wire SL2 may be a voltage wire for receiving the gate-off voltage VSS.

Two pixel columns (i.e., the sixth pixel column and the seventh pixel column) are disposed between the third data line DL3 and the fourth data line DL4, and the third signal wire SL3 is disposed between the sixth pixel column and the seventh pixel column. Here, the third signal wire SL3 may be a clock bar wire for receiving the clock bar signal CKB.

Referring to FIG. 16, a plurality of dot rows are provided in the display panel 100. Each of the plurality of dot rows may be connected to two gate lines. Specifically, a first dot row among the plurality of dot rows is disposed between the first and second gate lines GL1 and GL2, and a second dot row is disposed between the third and fourth gate lines GL3 and GL4.

Here, the dot row may be defined as a set of dots arranged in the first direction DR1, and the pixel column may be defined as a set of pixels arranged in the second direction DR2.

The pixels of the odd pixel column among the pixels of the first dot row may be connected to the second gate line GL2, and the pixels of the even pixel column may be connected to the first gate line GL1. The pixels of the odd pixel column among the pixels of the second dot row may be connected to the fourth gate line GL4, and the pixels of the even pixel column may be connected to the third gate line GL3.

No pixels are provided between the second and third gate lines GL2 and GL3. Each of the first and second sub-gate drivers 210 and 220 includes first to 2nth stages connected to the first to 2nth gate lines GL1 to GL2n in a one-to-one correspondence.

Especially, as shown in FIG. 18, first and second stages ASG1 and ASG2 for driving the first and second gate lines GL1 and GL2 may be provided between the second and third gate lines GL2 and GL3. The first and second stages ASG1 and ASG2 are disposed adjacent to each other in the first direction DR1.

FIG. 16 illustrates a structure in which a gate driver includes first and second sub-gate drivers as an example of the inventive concept. In this case, the second stage ASG2 of the first sub-gate driver 210 and the second stage ASG2 of the second sub-gate driver 220 may be provided between the second and third data lines DL2 and DL3. In addition, the third stage ASG3 of the first sub-gate driver 210 and the third stage ASG3 of the second sub-gate driver 220 may be provided between the second and third data lines DL2 and DL3.

However, the number of each of the second and third stages ASG2 and ASG3 provided between the second and third data lines DL2 and DL3 is not limited thereto. As the number of sub-gate drivers increases, the number of corresponding stages connected to one gate line may also increase correspondingly.

Referring to FIG. 17, the first dot DOT1' includes an effective area PXA and a driving area DRA. The effective area PXA is defined as an area where the first to third pixels PX1, PX2, and PX3 are provided to display an image. The driving area DRA is not an area for displaying an image but is an area where any one of the driving transistor (i.e., at least one of the first to fourth driving transistors TR1 to TR4) and the capacitor Cb is disposed.

Unlike the first dot DOT1 shown in FIG. 5, in the first dot DOT1' shown in FIG. 17, the driving area DRA is formed in the first direction DR1.

Specifically, the first dot DOT1' has a first width Px in the first direction DR1 and a second width Py in the second direction DR2. Herein, the effective area PXA has the first width Px in the first direction DR1 and a fifth width Py' in the second direction DR2. The driving area DRA may have a sixth width $P_\beta$ in the second direction DR2.

The width of each of the first to third pixels PX1, PX2 and PX3 in the first direction DR1 has a value identical to Px/3 in the first dot DOT1'. The sum of the fifth width Py' and the sixth width $P_\beta$ is equal to the second width Py and the width of each of the first to third pixels PX1, PX2, and PX3 in the first direction DR1 has a value identical to Py'.

Referring to FIGS. 16 and 18, the first sub-gate driver 210 includes first to 2nth stages for sequentially outputting first to 2nth gate signals to the first to 2nth gate lines GL1 to GL2n. The first stage ASG1 and the second stage ASG2 for outputting the second and third gate signals to the second and third gate lines GL2 and GL3 respectively may be distributed and disposed in the driving areas DRA of the dots arranged in the first dot row.

Although not shown in the drawing, the first stage for outputting the first gate signal to the first gate line GL1 may be formed in a non-display area disposed outside the display area DA. In addition, when the gate driver 200 further includes an additional dummy stage for driving in addition to the first to 2nth stages ASG1 to ASG2n, the dummy stages may also be disposed in the non-display area.

In particular, each of the first and second stages ASG1 and ASG2 may share a driving area of one or more dots. As shown in FIG. 18, the first stage ASG1 is formed as sharing the driving areas of the first and second dots DOT1 and DOT2, and the second stage ASG2 is formed as sharing the driving areas of the third and fourth dots DOT3 and DOT4.

The first to fourth driving transistors TR1 and the capacitor Cb of the first stage ASG1 are provided in the driving areas DRA of the first and second dots DOT1 and DOT2. In addition, the first to fourth driving transistors TR1 to TR4 and the capacitor Cb of the second stage ASG2 are provided in the driving area DRA of the third and fourth dots DOT3 and DOT4.

Since the connection relationship between the first to fourth driving transistors TR1 to TR4 and the first to fourth signal wires SL1 to SL4 is the same as that described above, a detailed description thereof will be omitted.

In such a manner, as the first to 2nth stages are formed in the display area DA, it is possible to reduce the size of the bezel area of the non-display area formed outside (or around) the display area DA.

According to the inventive concept, since a gate driver is disposed in a display area, the size of the bezel area of a display device may be reduced.

Although the exemplary embodiments of the present inventive concept have been described, it is understood that the present inventive concept should not be limited to these exemplary embodiments but various changes and modifications can be made by one ordinary skilled in the art within the spirit and scope of the present inventive concept as hereinafter claimed.

What is claimed is:

1. A display device comprising:
   a display panel including a plurality of gate lines extending in a first direction and arranged in a second direction, a plurality of data lines extending in the second direction and arranged in a first direction, and a display area including a plurality of dots directions, the plurality of dots including a plurality of dot rows extending in the first direction;
   a gate driver configured to sequentially supply gate signals to the plurality of gate lines; and
   a data driver configured to supply a plurality of data signals to the plurality of data lines, respectively,
   wherein the gate driver includes sub-gate drivers,
   the sub-gate drivers are disposed in the first direction to supply the gate signals to at least two positions of each gate line,
   each of the sub-gate drivers includes a plurality of stages each of which include a plurality of driving transistors and at least one capacitor, each of the plurality of stages being disposed both in a first dot row and in a second dot row of the plurality of dot rows,
   the first dot row is disposed between a first gate line and a second gate line of the plurality of gate lines and the second dot row is disposed between the second gate line and a third gate line of the plurality of gate lines, and
   each of the plurality of dots for all dots within the display area comprises pixel area, and a driving area disposed to a right side of the red pixel area, the green pixel area, and the blue pixel area.

2. The display device of claim 1, wherein each of the plurality of stages includes the plurality of driving transistors which are disposed in the driving area of at least one dot of the plurality of dots.

3. The display device of claim 1, wherein the sub-gate driver further includes a plurality of signal wires for receiving a control signal and a driving voltage, and the plurality of signal wires extend in the second direction and are arranged in the first direction.

4. The display device of claim 3, wherein one of the driving transistors have different channel sizes and the one of the driving transistor of the driving transistors includes sub-driving transistors which are disposed in driving areas of a plurality of dots.

5. The display device of claim 4, wherein at least one driving transistor is an output transistor connected to one gate line to output a gate signal.

6. The display device of claim 3, wherein each of the signal wires is disposed in a driving area disposed between adjacent dots not to overlap the adjacent dots.

7. The display device of claim 3, wherein the plurality of signal wires include:
   a plurality of driving voltage wires configured to receive the driving voltage,
   a clock wire configured to receive a clock signal in the control signal, and
   a clock bar wire configured to receive a clock bar signal in the control signal,
   wherein the driving voltage wire, the clock wire, and the clock bar wire are disposed to be spaced at least one dot apart from each other in the first direction.

8. The display device of claim 1, wherein the dot includes first to third pixels sequentially arranged in the first direction in the pixel area, and the driving area includes a first driving area disposed adjacent to the third pixel in the first direction.

9. The display device of claim 8, wherein the driving area further includes a second driving area disposed adjacent to the pixel area in the second direction.

10. The display device of claim 1, wherein one of the driving transistors have different channel sizes and the one of the driving transistor of the driving transistors includes sub-driving transistors which are disposed in driving areas of a plurality of dots.

11. The display device of claim 1, wherein the dot includes:
    first and second pixels sequentially arranged in the first direction in the pixel area, and
    a third pixel arranged in the second direction with respect to the first pixel in the pixel area, and
    a fourth pixel arranged in the second direction with respect to the second pixel and sequentially arranged in the first direction with respect to the third pixel.

12. The display device of claim 11, wherein the driving area includes a first driving area disposed adjacent to the second and fourth pixels in the first direction.

13. The display device of claim 12, wherein the driving area further includes:
    a second driving area disposed between the first and second pixels and the third and fourth pixels, and
    a third driving area disposed adjacent to the third and fourth pixels in the second direction, the third and fourth pixels being disposed between the second driving area and the third driving area.

14. The display device of claim 1, wherein the dot includes first to third pixels sequentially arranged in the first direction in the pixel area and the driving area is disposed adjacent to the first to third pixel in the second direction.

15. The display device of claim 14, wherein two pixels of a plurality of pixels disposed in one dot column are commonly connected to one data line of the plurality of data lines.

16. The display device of claim 15, wherein the sub-gate driver further includes a plurality of signal wires for receiving a control signal and a driving voltage,
    each of the plurality of signal wires extends in the second direction and disposed between two pixels connected to different adjacent data lines, and
    the signal wires are disposed to be spaced apart from each other in the first direction.

17. The display device of claim 1, wherein each of the plurality of stages includes odd stages connected to odd gate lines of the plurality of gate lines and even stages connected to even gate lines of the plurality of gate lines, and the odd stages and the even stages are arranged in a zigzag configuration.

18. The display device of claim 1, wherein each of the plurality of stages is disposed to be spaced a predetermined interval apart in the first direction from stages adjacent to each other in the second direction.

19. The display device of claim 18, wherein a stage provided in an ith dot row of the plurality of stages is shifted by at least one dot from a stage disposed in an i+1th dot row in the first direction.

* * * * *